(12) United States Patent
Chevalier

(10) Patent No.: US 9,458,608 B1
(45) Date of Patent: Oct. 4, 2016

(54) AUTOMATIC WATER SHUT-OFF AND NOTIFICATION SYSTEM AND METHOD OF USE

(71) Applicant: John David Chevalier, Aliso Viejo, CA (US)

(72) Inventor: John David Chevalier, Aliso Viejo, CA (US)

(73) Assignee: Flood Sentry, LLC, Mission Viejo, CA (US)

( * ) Notice: Subject to any disclaimer, the term of this patent is extended or adjusted under 35 U.S.C. 154(b) by 0 days.

(21) Appl. No.: 14/960,319

(22) Filed: Dec. 4, 2015

(51) Int. Cl.
| G08B 21/00 | (2006.01) |
| E03B 7/07 | (2006.01) |
| E03B 7/00 | (2006.01) |

(52) U.S. Cl.
CPC ............... *E03B 7/071* (2013.01); *E03B 7/003* (2013.01); *E03B 7/075* (2013.01)

(58) Field of Classification Search
CPC ............. Y10T 137/5762; Y10T 137/0452; Y10T 137/7727; Y10T 13/7761; F17D 5/02; E03B 7/071; G01M 3/04; G01M 3/18
USPC ......................................................... 340/605
See application file for complete search history.

(56) References Cited

U.S. PATENT DOCUMENTS

| 4,522,229 | A | | 6/1985 | Van de Moortele |
| 4,572,113 | A | | 2/1986 | Baughman |
| 4,705,060 | A | | 11/1987 | Goulbourne |
| 5,267,587 | A | * | 12/1993 | Brown ..................... E03B 7/071 137/486 |
| 6,105,607 | A | * | 8/2000 | Caise ..................... F16K 31/402 137/487.5 |
| 6,186,162 | B1 | | 2/2001 | Purvis et al. |
| 6,216,727 | B1 | * | 4/2001 | Genova ..................... F17D 5/02 137/460 |
| 6,526,807 | B1 | | 3/2003 | Doumit et al. |
| 6,812,848 | B2 | | 11/2004 | Candela |
| 6,840,457 | B2 | | 1/2005 | Park et al. |
| 7,253,741 | B2 | | 8/2007 | Fiorletta et al. |

(Continued)

FOREIGN PATENT DOCUMENTS

| CN | 203132977 | 8/2013 |
| FR | 2797648 A1 | 2/2001 |
| JP | 2003261965 A | 9/2003 |

OTHER PUBLICATIONS

Flood Master Plumbing Leak Protection & Water Main Shut-Off Systems image from website www.floodmaster.com-products-water-main-leak-detection-shutoff.php, image saved on Nov. 25, 2015.

(Continued)

*Primary Examiner* — Mark Rushing
(74) *Attorney, Agent, or Firm* — One3 IP Management, P.C.; Justin G. Sanders; Dean G. Stathakis

(57) ABSTRACT

An automatic water shut-off and notification system for interfacing with a water valve and an existing security system having a security system control panel and at least one water sensor connected wired or wirelessly on a zone of the security system control panel, the automatic water shut-off and notification system comprising a control module, the control module comprising: a trig input terminal configured for connection with an output terminal of the security system control panel; a valve control terminal and a valve power terminal configured for connection with the water valve; and a processor connected to the trig input terminal and the valve control and valve power terminals, the processor configured to act on a detection signal received at the trig input terminal indicating water detection by the at least one water sensor to activate the water valve.

21 Claims, 10 Drawing Sheets

(56) References Cited

U.S. PATENT DOCUMENTS

| | | | |
|---|---|---|---|
| 8,402,984 B1 | 3/2013 | Ziegenbein et al. | |
| 8,439,062 B1 | 5/2013 | Ziegenbein et al. | |
| 8,922,379 B1 | 12/2014 | Meyer | |
| 2004/0226614 A1* | 11/2004 | Lane | E03B 7/071 137/487.5 |
| 2005/0195081 A1* | 9/2005 | Studnicki | G01C 9/06 340/539.26 |
| 2008/0224876 A1 | 9/2008 | Fish | |
| 2013/0241727 A1* | 9/2013 | Coulombe | G08B 23/00 340/517 |

OTHER PUBLICATIONS

GreenField Direct, LLC PipeBurst Pro Automatice Water Protection Systems image from website www.greenfielddirect.com-pipeburst-pro/, image saved on Nov. 25, 2015.

Home Plus + Leak Detection Water Leak Detection Systems image from website www.a-leak-detector.com, image saved on Nov. 25, 2015.

* cited by examiner

AUTOMATIC WATER SHUT-OFF AND NOTIFICATION SYSTEM AND METHOD OF USE

RELATED APPLICATIONS

Not applicable.

BACKGROUND

The subject of this patent application relates generally to water leak detection and mitigation devices, systems and methods, and more particularly to automatic water shut-off and notification systems and methods of use configured for operably and efficiently interfacing with existing security systems.

Applicant(s) hereby incorporate herein by reference any and all patents and published patent applications cited or referred to in this application.

By way of background, leaks in copper water pipes have become a serious and widespread problem due to chemical erosion thought to be caused by chlorine and ammonia added to the water supply, coupled of course with the passage of time. Homes with copper water pipes over 5 years old may experience multiple pinhole leaks that can quickly grow if not detected and cause catastrophic water damage. Detection and local annunciation as by wired or wireless water sensors placed in strategic locations within a building where unintended or undesired water might be present is not, by itself, effective since this approach requires someone to be physically present to hear the alarm and take steps to shut off the water supply. Automatic reporting to a central monitoring station is an improvement that can provide for 24-hour notification to responsible parties who can respond. But this takes time and there is no guarantee that someone can be reached or will be able to respond. Meanwhile, water damage may continue unmitigated.

More recently, systems for automatic water shutoff coupled with 24-hour leak detection equipment such as described above (e.g., wired or wireless sensors) have been proposed for effective flood prevention. One example is the "Leak Detection and Shut-off Apparatus" disclosed in U.S. Pat. No. 6,186,162 to Purvis et al. Generally, the one or more water sensors are connected to a controller that operates an electromechanical ball or other such valve to automatically shut off the water in a supply pipe when a leak is detected by a sensor. Such systems have even included the improvement of an automated pressure dump valve or the like to relieve leak-promoting pressure that may remain in the supply pipe after shut-off, such as proposed in U.S. Pat. No. 8,402,984 to Ziegenbien et al.

However, even such automatic water shutoff systems have deficiencies. They are most often complete proprietary systems that include not only the water detection sensors (either hardwired or wireless) and a water valve installed in the main water line that interrupts the flow when a leak is detected, but, most notably, a stand-alone central control panel through which the one or more sensors and valves are connected and operate. U.S. Pat. No. 8,922,379 to Meyer is but one example. As such, these "stand-alone" or "dedicated" systems are relatively complex to install and operate and relatively expensive, particularly due to the separate controller. If such automatic shut-off systems are to interface with an existing security system for further notification capability, they typically provide a single dry-contact output which can connect to external sounders or visual indicators, auto dialers, or security systems themselves to initiate a phone call to either an individual or central monitoring station. But such single-output systems can only activate a single zone input on a security system panel, which would generate an audible alert and communication, but would not be able to report which of multiple sensors tripped, sensor status (such as low battery, sensor fault, loss of wireless signal or auto self-test), or system status, even at the higher cost and somewhat redundant inclusion of the automatic shut-off system's separate, dedicated control unit.

What is needed and has been heretofore unavailable is an automatic water shut-off system that interfaces with an existing security alarm panel and effectively converts it into a complete flood prevention system, encompassing the core functions of leak detection, shut-off, and reporting mentioned above.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing an automatic water shut-off and notification system for interfacing with a water valve and an existing security system having a security system control panel and at least one water sensor connected wired or wirelessly on a zone or zones of the security system control panel. In at least one embodiment, the automatic water shut-off and notification system comprises a control module, the control module comprising: a trig input terminal configured for connection with an output terminal of the security system control panel; a valve control terminal and a valve power terminal configured for connection with the water valve; and a processor connected to the trig input terminal and the valve control and valve power terminals, the processor configured to act on a detection signal received at the trig input terminal indicating water detection by the at least one water sensor; wherein with the control module installed and operably connected to the security system control panel and to the water valve, upon water detection by one or more of the at least one water sensors, the security system control panel sends the detection signal via the output terminal to the trig input terminal of the control module, and in response the processor then activates the water valve via the valve control terminal and the valve power terminal to close the water valve and shut off the flow of water in a pipe in which the water valve is installed; whereby the configuration of the control module of the automatic water shut-off and notification system enables use of the functionality of an existing security system and one or more water sensors connected thereto and the resulting output detection signal generated by the security system control panel to control the water valve.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1A:
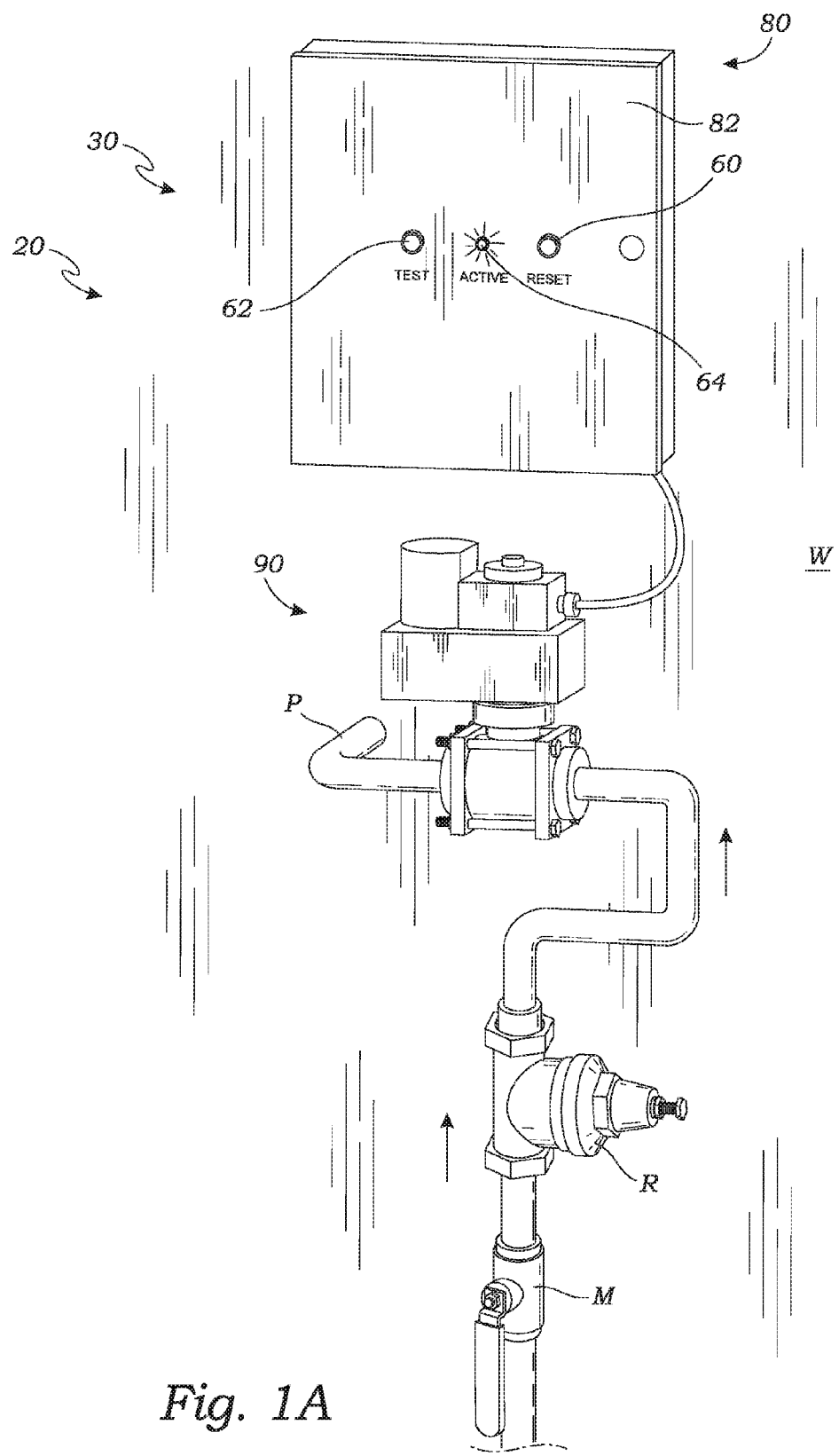
FIG. 1A is a schematic perspective view of an exemplary automatic water shut-off and notification system as installed in connection with existing plumbing, in accordance with at least one embodiment.
Figure 1B:
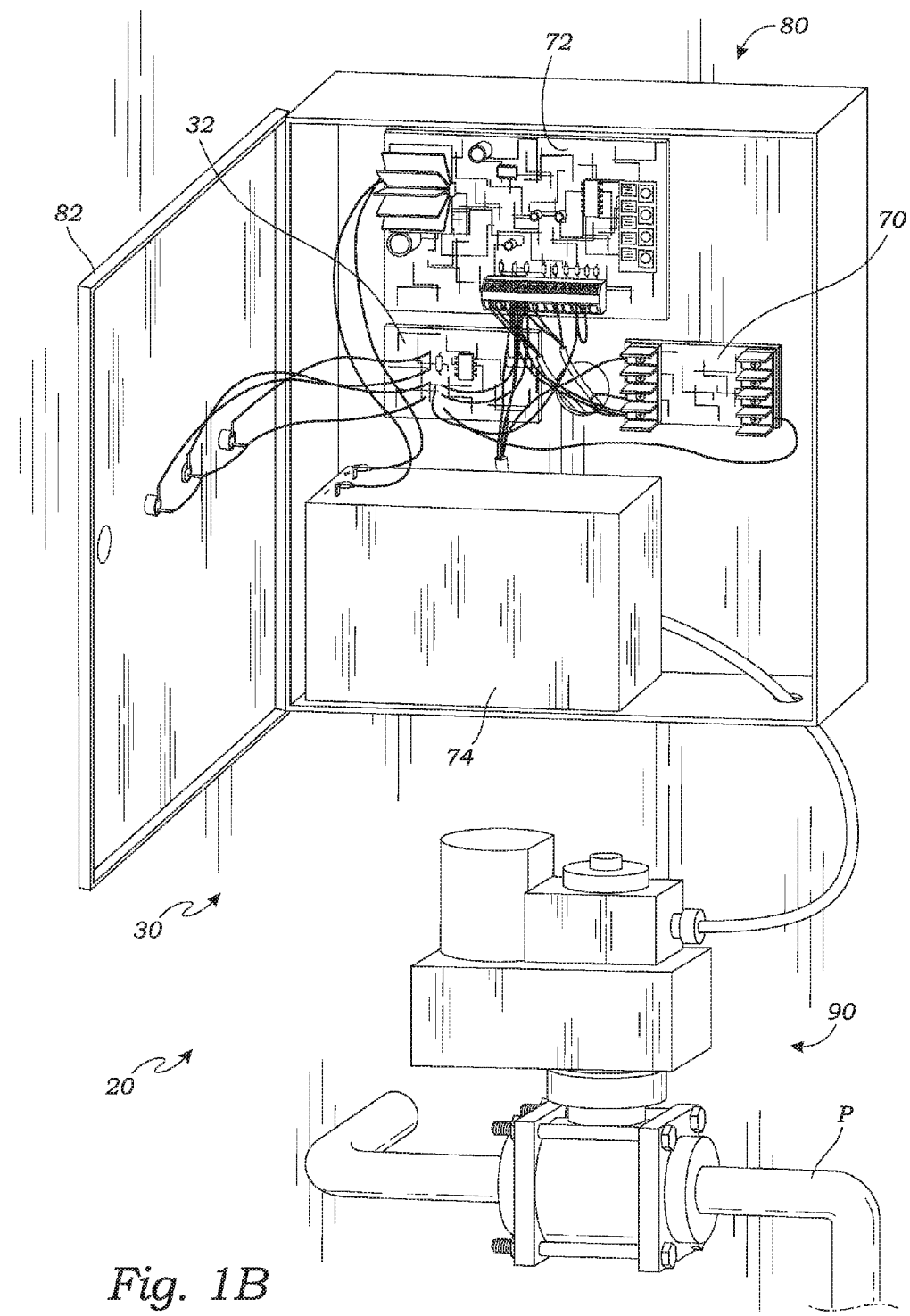
FIG. 1B is an enlarged schematic perspective view thereof with the door on the electronics housing open, in accordance with at least one embodiment.

Turning now to FIGS. 1A and 1B, there are shown perspective views of an exemplary embodiment of an automatic water shut-off and notification system 20 according to aspects of the present invention. The system 20 generally comprises, in the exemplary embodiment, a control module 30 and a water valve 90. The control module 30 connects to an existing security system 100 (FIGS. 2A and 2B) and the water valve 90 that, when activated, shuts off the water supply, releases the pressure in the pipe P and drains it to the outside. It will be appreciated that while in the illustrated embodiment a special, dedicated water valve 90 is operably installed in the pipe P as part of the system 20, in other embodiments the water supply plumbing may already be equipped with any such shut-off valve, in which case the automatic water shut-off and notification system 20 essentially entails the proprietary control module 30 operably installed in conjunction with both the existing valve 90 and the existing security system 100. Where the valve 90 enables both shut-off and pressure release/drain, it will be further appreciated that a three-way ball valve or the like may be employed, more about which is said further below. Clearly, a simple two-way shut-off valve or any other valve now known or later developed may also be alternatively employed without departing from the spirit and scope of aspects of the present invention.

The automatic water shut-off and notification system 20 advantageously uses the security system 100's built-in detection, zoning, diagnostic, and communication capabilities for those functions, while adding further functions of the control module 30 to control the external three-way or other water shut-off/pressure release/drain valve 90. Depending upon the security panel, anywhere from 1 to 128 or more individual hardwired or wireless water sensors 190, 192 (FIGS. 6 and 7, respectively) can be monitored and fully supervised, with sensor-specific information displayed on a keypad 160 of the security system 100 (FIGS. 2A and 2B) and/or reported to a central monitoring station and/or a remote cellphone app as by a phone call, text message, or email message. Those skilled in the art will appreciate that this configuration of the automatic water shut-off and notification system 20 and use of an existing security system 100 is an important distinction relative to other systems, where the integrity and condition of the sensors 190, 192 is not monitored or communicated to a central station or otherwise made available through an existing security panel, instead only reporting a leak without any zone specificity and unable to provide any status information on particular zones or sensors. According to aspects of the present invention, by using the powerful built-in capabilities of modern security panels, every sensor 190, 192 connected is fully supervised and can report battery condition, zone fault, self-test, tamper, loss of signal, and the like by zone or for each individual sensor 190, 192 while the control module 30 enables the detection of a water leak by any such sensor 190, 192 to be acted on in automatically shutting off the water. In this way, advantage is taken of the functionality of existing security panels and additional functionality for valve control is supplemented. It will be appreciated that the resulting per-zone supervisory capability coupled with the control and notification capability is vital in a flood prevention system because if a sensor is offline due to a fault or a low battery and this failure is not detected and communicated to a monitoring station or user, then a water leak could go undetected and cause significant damage of the sort such a flood detection system was to prevent.

As will thus be appreciated from the present specification, an advantage of the automatic water shut-off and notification system 20 according to aspects of the present invention is that it doesn't require the purchase and installation of an entire dedicated system just for flood detection. Rather, because the system 20 is effectively an add-on module, it can be relatively easily and inexpensively incorporated into most any existing security system 100 to provide flood prevention capability, with or without the inclusion of a special three-way valve 90, thereby offering additional functionality to the numerous security systems already installed and in use in the field. Or, the system 20 can be incorporated into any new security system installation as a relatively simple and inexpensive add-on accessory.

Figure 8A:
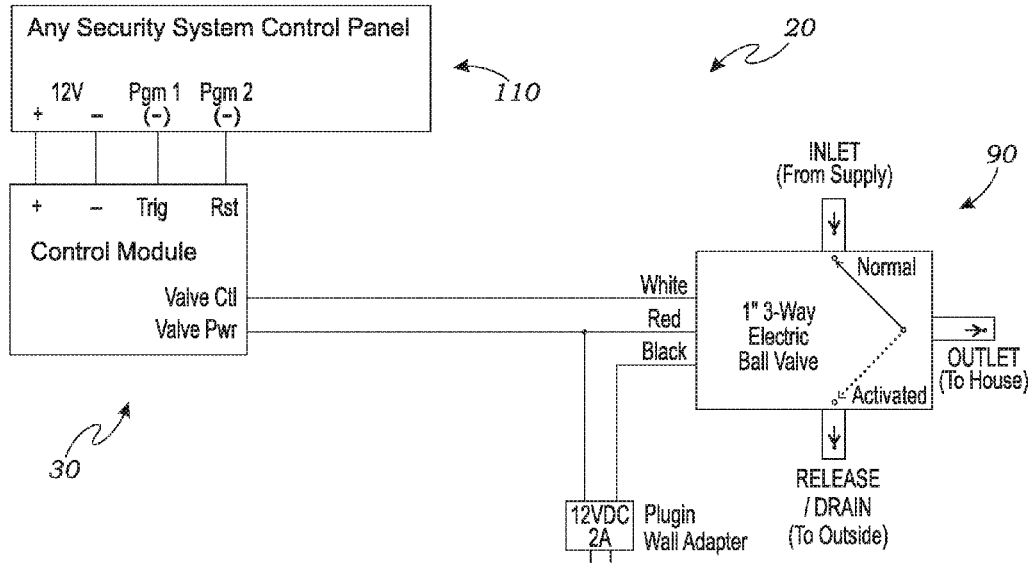
FIG. 8A is an electrical schematic thereof as connected in close proximity to a security system control panel and also to a valve, in accordance with at least one embodiment.
Figure 8B:
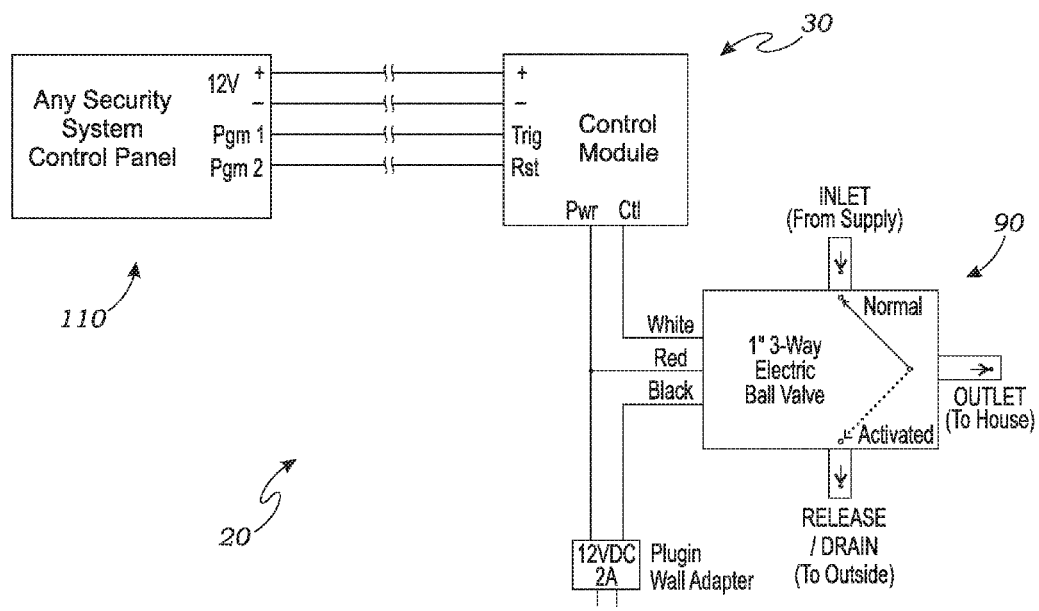
FIG. 8B is an electrical schematic thereof as connected to a remote security system control panel and also to a valve, in accordance with at least one embodiment.

With continued reference to FIGS. 1A and 1B, the control module 30 of the exemplary automatic water shut-off and notification system 20 is shown as being a self-contained unit housed within an electronics housing 80, here installed on a wall W of a building or other structure substantially adjacent to a water supply pipe P in which is installed a water shut-off valve 90 but remote of any existing security system 100, as basically illustrated schematically in FIG. 8B. As shown in FIG. 1B with the door 82 of the housing 80 opened to reveal the interior components, the control module 30 comprises a control module board 32 electrically connected to a separate power supply board 72 and relay board 70. A back-up battery 74 is wired to the power supply board 72 for power should the main power go down. As best seen in FIG. 1A, a reset button 60 and a test button 62 wired to the control module board 32 are operably installed in the door 82 of the housing 80. As the names of these components imply, selecting the reset button 60 resets the system 20, and the control module 30 particularly, after a water detection and/or valve activation event, such as after a leak has been repaired or mitigated, and selecting the test button 62 simply tests the system 20 by latching the control module 30 and manually activating the valve 90. Again, pressing the reset button 60 after such a test cycle will restore the system 20 to normal or "ready" operation. Also shown installed in the door 82 and wired to the control module board 32 is an indicator light 64, which as its name implies provides a visual indication of the status of the system 20, such as illumination indicating that the valve 90 is activated or closed, or the color of illumination such as red indicating that the valve 90 is activated or closed and green indicating that the system 20 is ready. It will be appreciated that a number of such components and operable configurations are possible without departing from the spirit and scope of the invention, as will be further appreciated from alternative embodiments herein even eliminating certain of the control module 30 components or concentrating more of them on the control module board 32.

Figure 2A:
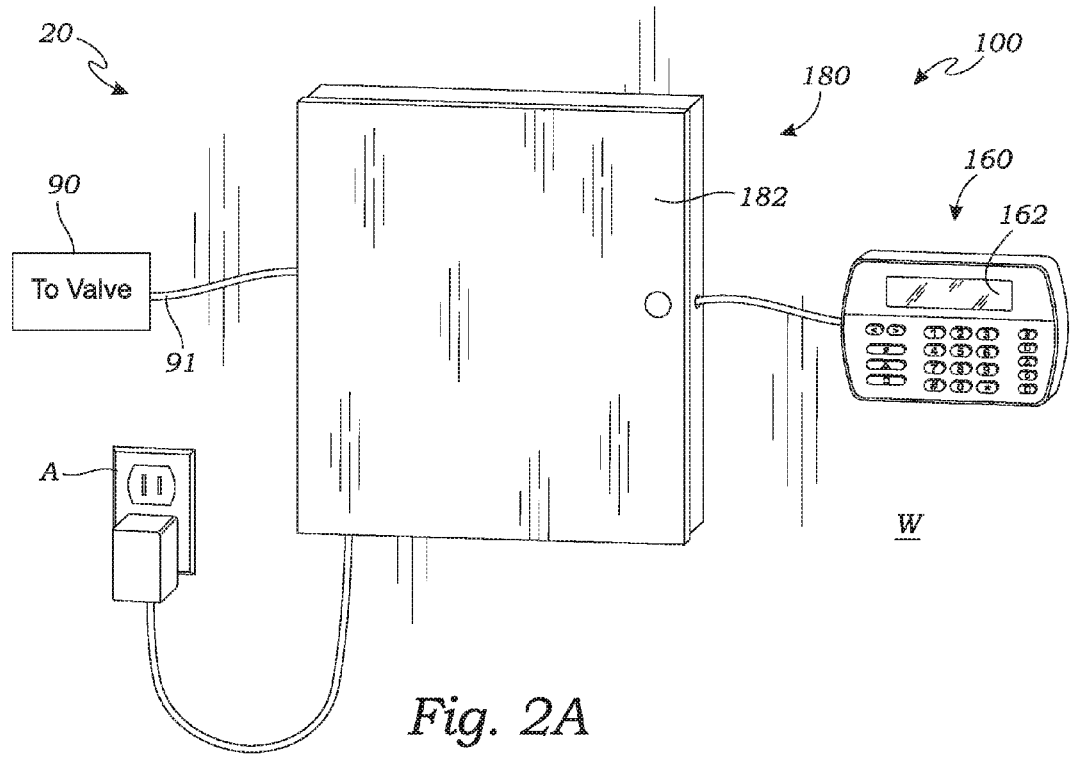
FIG. 2A is a schematic perspective view of an alternative exemplary automatic water shut-off and notification system as installed in connection with an existing security system, in accordance with at least one embodiment.
Figure 2B:
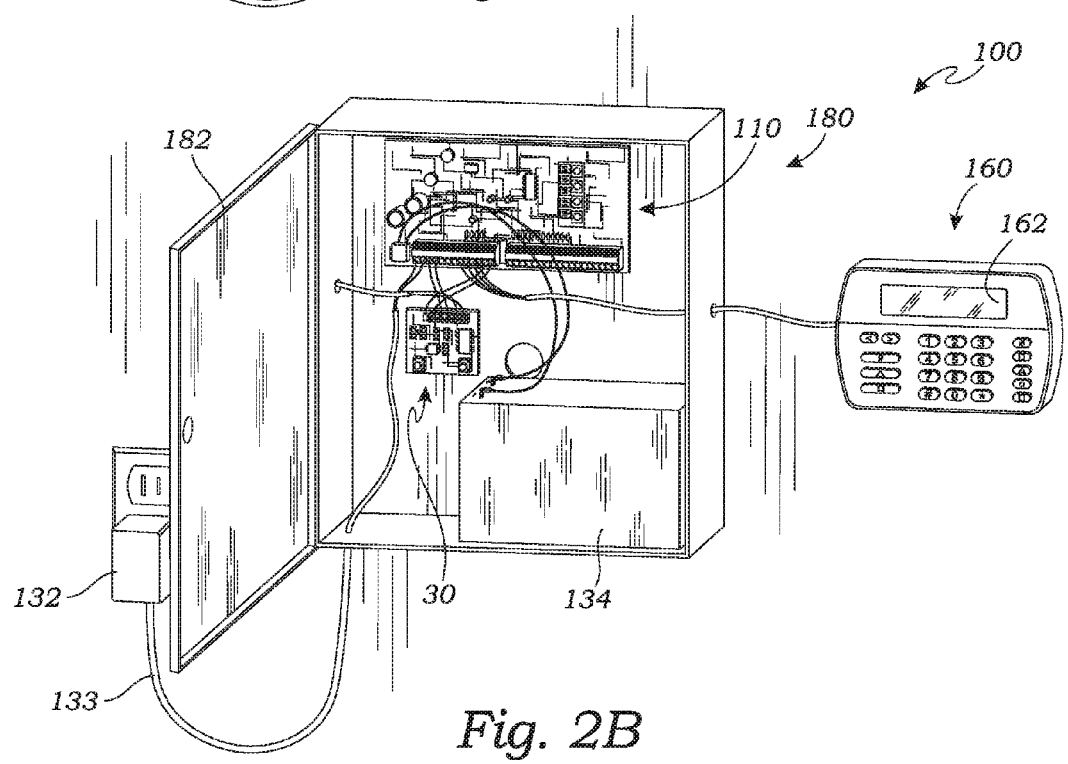
FIG. 2B is a schematic perspective view thereof with the door on the electronics housing open, in accordance with at least one embodiment.
Figure 2C:
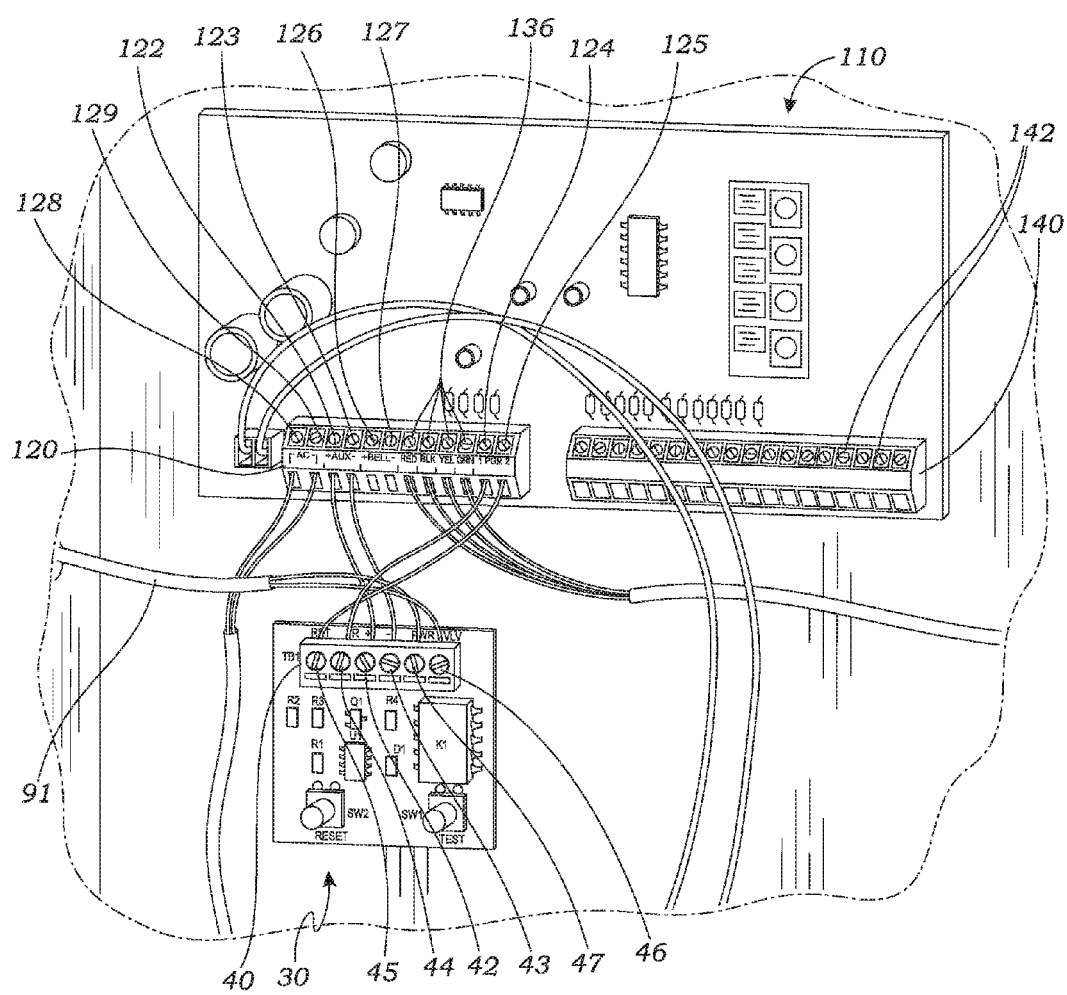
FIG. 2C is an enlarged, partial schematic perspective view thereof with the door on the electronics housing open, in accordance with at least one embodiment.

Turning to FIGS. 2A-2C, there are shown perspective views of an alternative exemplary automatic water shut-off and notification system 20 according to aspects of the present invention. Here, an existing security system 100 is shown as generally comprising power and control components within a security system housing 180 and an adjacent keypad module 160. Particularly, as seen in FIG. 2B showing the security system housing door 182 open, the security system 100 includes a security system control panel 110 connected to the keypad 160 and to an AC power outlet A and a back-up battery 134. In the exemplary embodiment, a 16-volt 20 VA plug-in transformer 132 plugged into the AC power outlet A connects via a 2-wire cable 133 to "AC" terminals 128, 129 on the security system control panel 110. As best seen in the enlarged partial perspective view of FIG. 2C, the proprietary control module 30 is in this alternative exemplary embodiment installed within the security system housing 180 adjacent to the security system control panel 110. Specifically, as illustrated, the control module 30 may be formed with a control module terminal strip 40 configured with a number of terminals for operable electrical connection to the security system control panel 110 and the valve 90 (FIG. 2A). First, the control module 30 is configured to be powered by the security system control panel 110, here as by connecting a positive power terminal 42 on the control module terminal strip 40 to a corresponding first auxiliary power terminal 122 on the control panel terminal strip 120 and a negative power terminal 43 on the control module terminal strip 40 to a corresponding second auxiliary power terminal 123 on the control panel terminal strip 120. Again, the security system control panel 110 is primarily powered by the AC plug 132 connected on the first and second AC power terminals 128, 129 of the control panel terminal strip 120 and plugged into the outlet A. Advantageously, the control module 30 is thus powered without having to separately equip the control module 30 with its own power supply, board or the like. Those skilled in the art will appreciate that location of the control module 30 adjacent to the security system control panel 110, and even within the security system housing 180, certainly facilitates such power sharing but that such benefit may be derived even if the control module 30 is located remote of the security system control panel 110. In the exemplary embodiment, the control module terminal strip 40 further includes a trig input terminal 44 connected to a first program output terminal 124 on the control panel terminal strip 120. More will be said about this pairing below regarding the system 20 in use in various configurations, such as shown schematically in FIGS. 6-11, but it is here sufficient to note that beneficially the connection of the timed programmable output 124 on the security system control panel 120, and the control panel terminal strip 120 specifically, enables detection of water by any water sensors 190, 192 (FIGS. 6 and 7) connected to zone terminals 142 of a separate zone terminal strip 140 operably mounted on the security system control panel 110 to communicate a detection signal from the output terminal 124 to the trig input terminal 44 on the control module terminal strip 40 to trip the control module 30 circuit, which then latches that output, boosts its power and activates the three-way valve 90, shutting off the water and releasing the pressure and draining the water in the pipes safely to the outside. Again, in this way valve control is achieved via the control module 30 while otherwise avoiding unnecessary duplication of power, communication, and other functions already provided through the existing security system 100. That is, those skilled in the art will appreciate the clever and symbiotic interface of the control module 30 with the security system control panel 110 so as to add functionality not found in the control panel 110 while duplicating little if any functionality that is found in typical security system control panels 110. Specifically, it is noted that known security system control panels 110 do not latch their outputs, rendering them unable to control a valve without a device such as the disclosed control module 30. With continued reference to FIG. 2C, there is also shown a remote reset input terminal 45 on the control module terminal strip 40 connected to a second program output terminal 125 on the control panel terminal strip 120, which connection enables a command communication or sequence to be sent to the control module 30 from the security system control panel 110 in order to reset the control module 30 such as after a test cycle or a valve activation that is to be cleared, such as after a detected leak has been repaired or mitigated. The reset command can be initiated at the security system control panel 110 through a number of means, including but not limited to through selections on the keypad 160 or remote communication with the security system 100 employing any wired or wireless technology now known or later developed. Finally, there is shown in FIG. 2C that each of a valve control terminal 46 and a valve power terminal 47 on the control module terminal strip 40 connected through a two-wire cable 91, more about which is said below in connection with FIGS. 6-11. As also best seen in FIG. 2C, as illustrated, the control panel terminal strip 120 may also include first and second bell output terminals 126, 127 for connecting an audible or visual (strobe) alarm that may be selectively activated according to the parameters of the security system 100, which in the exemplary embodiment could serve as a further "local" or "on-site" alert if a water leak is detected. Further, the control panel terminal strip 120 may include a plurality of common bus terminals 136 on which may be connected a peripheral device such as the keypad 160 (FIGS. 2A and 2B) or a radio receiver module 170 (FIGS. 7, 9 and 10), more about which is said below.

Figure 3:
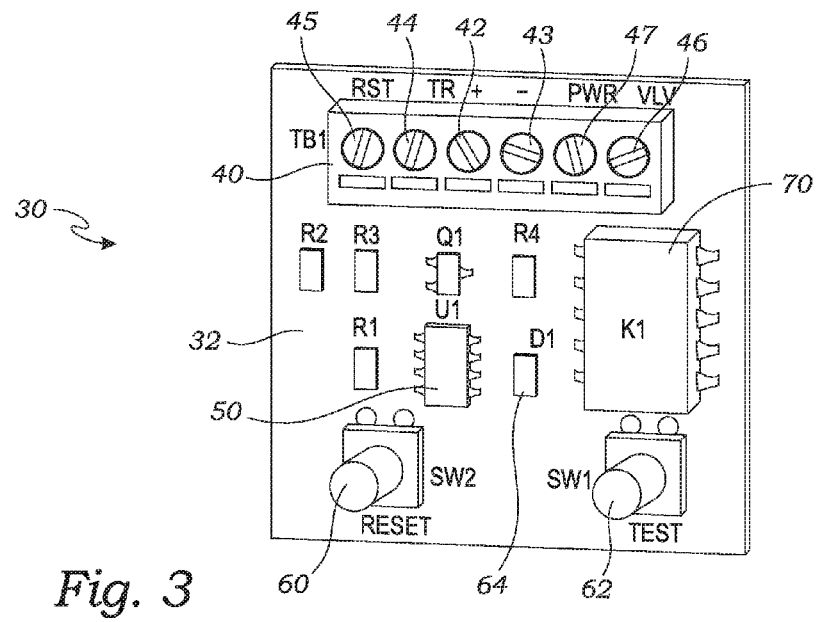
FIG. 3 is an enlarged schematic perspective view of the control module thereof, in accordance with at least one embodiment.

Referring to FIG. 3, there is shown a further enlarged perspective schematic view now of the control module 30 alone. Again, the control module 30 is comprised of a control module board 32 on which the various components are electrically installed. First, in the exemplary embodiment, the control module 30 includes installed at the upper end of the board 32 the control module terminal strip 40 having six terminals, from left to right: a remote reset input terminal 45; a trig input terminal 44; a negative power terminal 43; a positive power terminal 42; a valve power terminal 47; and a valve control terminal 46. It will be appreciated by those skilled in the art that the configuration and location of the control module terminal strip 40 and the number and arrangement of the terminals 42-47 thereon are merely illustrative and non-limiting, with a variety of other such electrical components now known or later developed being possible according to aspects of the present invention. Opposite the control module terminal strip 40 along the bottom of the control module board 32 there are operably installed a reset button 60 and a test button 62. Once more, when the control module 30 is installed, manually selecting the reset button 60 resets the system 20, and the control module 30 particularly, after a water detection and/or valve activation event, such as after a leak has been repaired or mitigated, as an alternative to the remote reset capabilities provided via the security system control panel 110 and its connection to the remote reset input terminal 45. Manually selecting the test button 62 simply tests the system 20 by latching the control module 30 and manually activating the valve 90. Though not shown, it will be appreciated that the system 20 may be configured to enable remote initiation of a test sequence just as for a reset sequence. And as previously indicated, pressing the reset button 60 after such a test cycle will restore the system 20 to normal or "ready" operation. Also installed on the control module board 32 is an indicator light 64, which provides a visual indication of the status of the system 20, such as illumination indicating that the valve 90 is activated or closed, or the color of illumination such as red indicating that the valve 90 is activated or closed and green indicating that the system 20 is ready. It will again be appreciated that a number of such components and operable configurations are possible without departing from the spirit and scope of the invention, such that those shown and described are to be understood as merely exemplary. As also shown best in FIG. 3, the control module 30 includes a relay 70 mounted on the control module board 32, here along the right side above the test button 62, more about which is said below particularly in connection with the electrical schematic of FIG. 5. Finally with reference to FIG. 3, also mounted substantially centrally on the control module board 32 is a processor 50 that is electrically connected to both the control module terminal strip 40 and the relay 70 as well as the reset button 60, the test button 62, and the indicator light 64. The control module 30 may also include as operably installed on the control module board 32 other electrical components such as resistors and capacitors as needed. In the exemplary embodiment, the control module board 32 measures only approximately one-and-a-half inches (1.5") square, with the board 32 itself employing surface mount CMOS chip technology. It is powered by 3-15 VDC at less than 1 mA, with power again typically provided by the security system control panel 110, specifically +12 VDC auxiliary power for external devices. Those skilled in the art will appreciate that the relatively small size and low power draw of the module 30 allows it to be installed or connected directly to an alarm system control panel 110, thus beneficially eliminating the need for a separate power supply and backup battery. The module 30 is triggered by a negative (−) or ground output generated by the security panel 110 either through the "Siren" or "Bell" output terminals 126, 127 or by any programmable (−) output 124, 125 upon violation of a flood sensor zone. When triggered, the circuit 30 latches and activates an onboard LED 64 and a high-current relay 70, which sends 12V at 2 Amps to the valve 90, causing it to close the inlet port and open the vent/drain port as described herein. Once again, those skilled in the art will appreciate that any such components in any appropriate electrical arrangement now known or later developed are possible according to aspects of the present invention without departing from its spirit and scope. With continued reference to FIG. 3 as well as FIG. 2C, it will be appreciated that while the control module 30 is shown as having no enclosure and thus with the control module board 32 mounted directly within the security system control panel housing 180, the control module 30 may also have its own housing, such as installing the control module board 32 in a small plastic case with openings in its face for the reset and test pushbuttons 60, 62 and the indicator light 64 to protrude. Due to its relatively small size, the control module 30, whether or not having its own housing, may be attached to a wall or inside the security system control panel housing 180 employing any attachment means now known or later developed, including but not limited to screws, plastic standoffs or two-sided foam tape. In practice, all of the connections with the control panel 110 illustrated can be accomplished via a 4-conductor 22 ga cable and to the valve 90 with a 2-conductor 18 ga cable, for example.

Figures 4A, 4B:
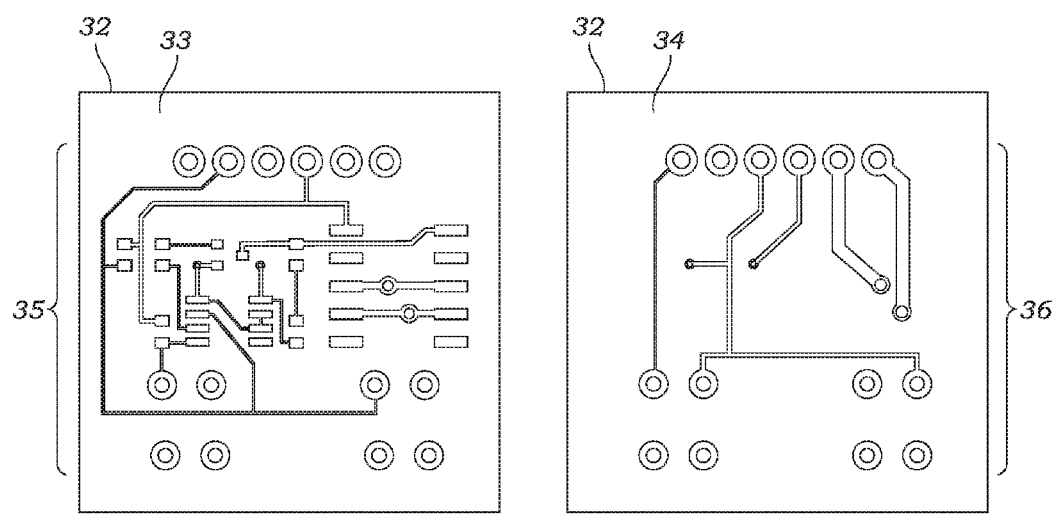
FIG. 4A is a schematic front view of the circuit wire traces thereof, in accordance with at least one embodiment.
FIG. 4B is a schematic back view of the circuit wire traces thereof, in accordance with at least one embodiment.

With brief reference to FIGS. 4A and 4B, in terms of connecting the various electrical components on the control module board 32, such as the processor 50 to the control module terminal strip 40, the relay 70, the reset button 60, the test button 62, and the indicator light 64 and the relay 70 to the valve control and valve power terminals 46, 47, wire traces are employed on the board 32 in a manner known in the art. Particularly, shown in FIG. 4A is a schematic of the circuit traces 35 formed on the front side 33 of the board 32, and shown in FIG. 4B is a schematic of the circuit traces 36 formed on the back side 34 of the board 32. It will be appreciated that a variety of such traces may be employed to suit a particular control module circuit design, such that the traces shown in FIGS. 4A and 4B are to be expressly understood as exemplary and non-limiting.

Figure 5:
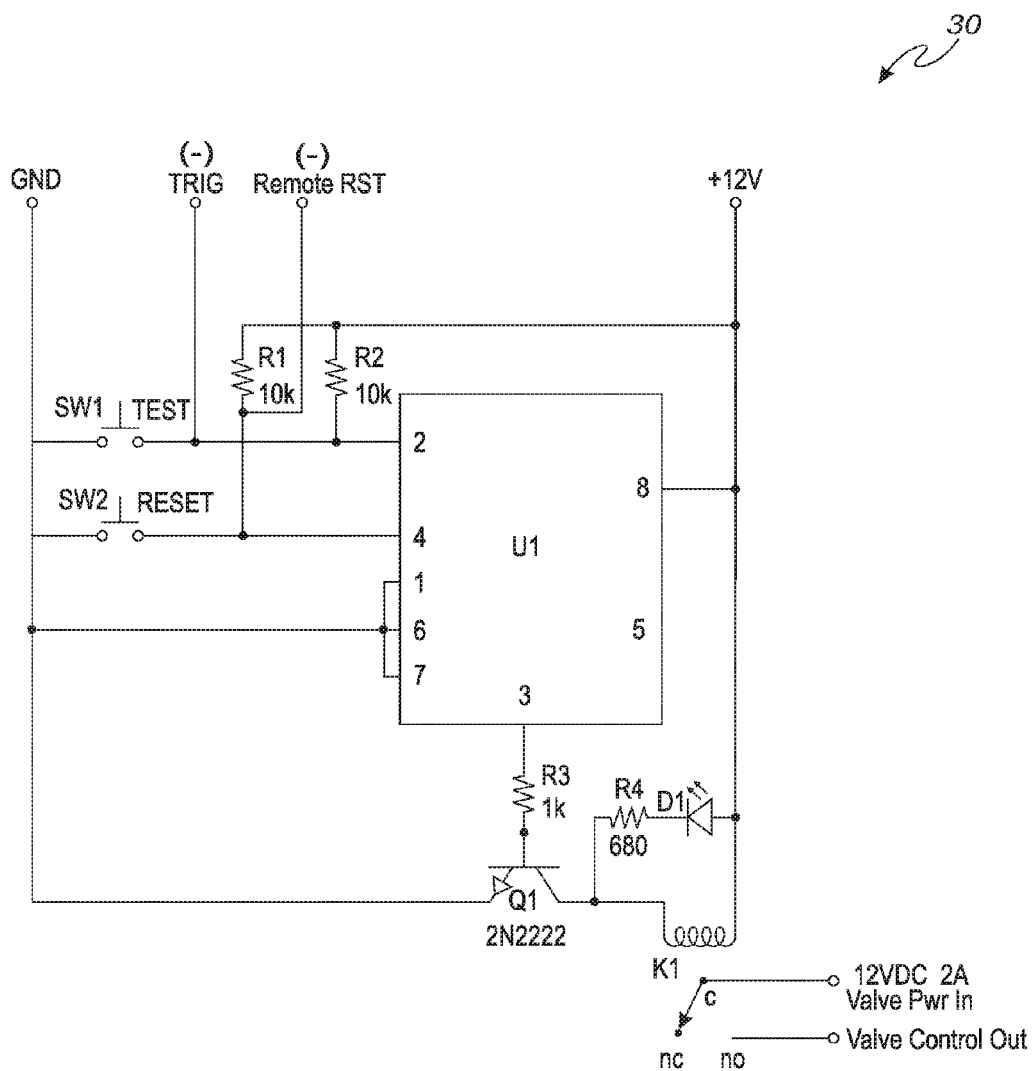
FIG. 5 is an electrical schematic thereof, in accordance with at least one embodiment.

Turning next to FIG. 5, there is shown an electrical schematic of the exemplary control module 30 of FIGS. 2-4. In such electrical schematic, consistent with the labeling of the components in FIG. 3, there are shown: the processor 50 labeled as "U1"; the positive power terminal 42 (labeled as "+12V"); the negative power terminal 43 labeled as "GND";

the trig input terminal 44 labeled as "(−) TRIG"; the remote reset input terminal 45 labeled as "(−) Remote RST"; the valve control terminal 46 labeled as "Valve Control Out"; the valve power terminal 47 labeled as "12 VDC 2A Valve Pwr. In"; and the relay 70 labeled as "K1". As shown, the relay 70 ("K1") is operably configured adjacent and in selective electrical connection with the valve control and power terminals 46, 47 ("Valve Control Out" and "Valve Pwr In") for resulting selective control of the valve 90 (FIG. 2A). As also shown in FIG. 5, the circuit includes the reset button 60 (labeled as "SW2 RESET"), the test button 62 (labeled as "SW1 TEST"), and the indicator light 64 (labeled as "D1"). Once again, those skilled in the art will appreciate that such electrical schematic representative of the control module 30 is merely exemplary, and a variety of electrical components and arrangements now known and later developed may be employed in the design, fabrication, and operation of the control module 30 beyond that shown and described without departing from the spirit and scope of the present invention.

Figure 6:
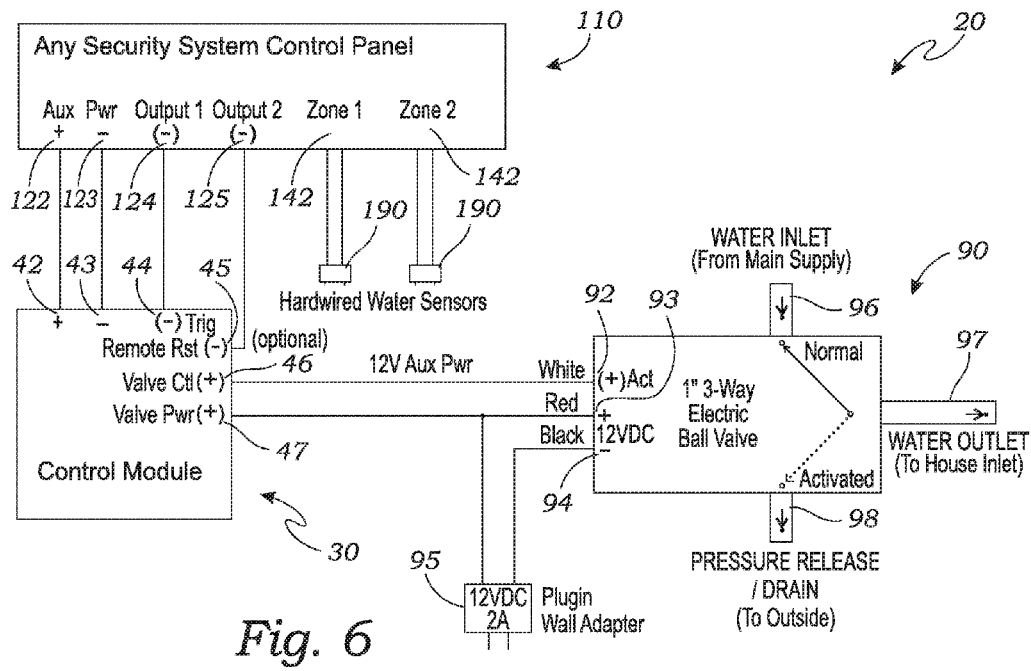
FIG. 6 is an electrical schematic thereof as connected to a security system control panel and a valve, the security system having hardwired water sensors, in accordance with at least one embodiment.
Figure 7:
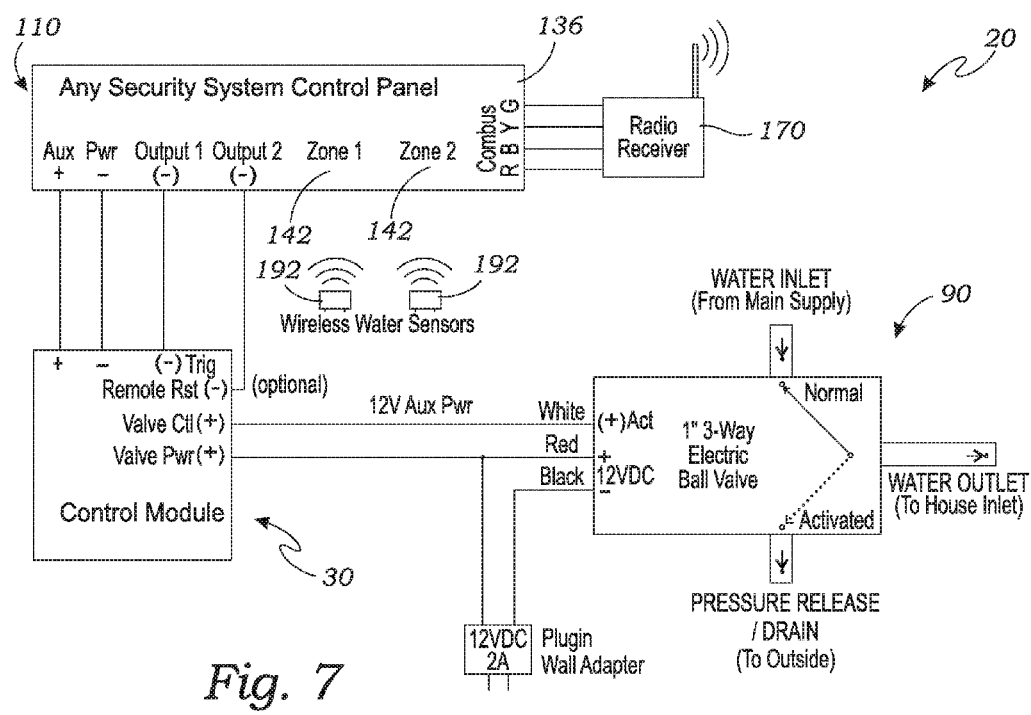
FIG. 7 is an electrical schematic thereof as connected to a security system control panel and a valve, the security system having wireless water sensors, in accordance with at least one embodiment.

Referring now to FIGS. 6 and 7, there are shown schematics representing further exemplary automatic water shut-off and notification systems 20 according to aspects of the present invention. First, in FIG. 6, it can be seen that the system 20 comprises a control module 30 interfacing with the control panel 110 of an existing security system 100 and with a water valve 90. The control module 30 again includes: the positive power terminal 42 labeled as "+"; the negative power terminal 43 labeled as "−"; the trig input terminal 44 labeled as "(−) Trig"; the remote reset input terminal 45 labeled as "Remote Rst (−)"; the valve control terminal 46 labeled as "Valve Ctl (+)"; and the valve power terminal 47 labeled as "Valve Pwr (+)". The processor 50 and relay 70 and other circuit elements of the control module 30 are not shown for simplicity. As again appreciated from the foregoing, the positive and negative power terminals 42, 43 on the control module 30 (labeled as "+" and "−") are electrically connected to the respective first and second auxiliary power terminals 122, 123 on the security system control panel 110 (labeled as "Aux Pwr +−") so that the power to the control module 30 is supplied by the control panel 110. The trig input terminal 44 (labeled as "(−) Trig") of the control module 30 is connected to the first program output terminal 124 (labeled as "Output 1 (−)") on the security system control panel 110, whereby, once more, a signal associated with a water detection event can be sent by the control panel 110 to the control module 30 so as to latch the circuit and activated the valve 90, more about which is said below. Optionally, a remote reset input terminal 45 (labeled as "Remote Rst (−)") on the control module 30 may be connected to a second program output terminal 125 (labeled as "Output 2 (−)") to allow for remote reset of the module 30 through the operation and communication functionality of the security system 100, and the security system control panel 110, specifically. The security system control panel 110 is further shown in FIG. 6 as having two zone terminals 142 labeled as "Zone 1" and "Zone 2" each having connected thereto a hardwired water sensor 190. It will be appreciated by those skilled in the art that virtually any number of zones (zone terminals 142) and hence water sensors 190 may be incorporated in the security system 100, such that two sensors 190 as illustrated is merely exemplary. Moreover, while the water sensors 190 are shown a finite or relatively short distance from the control panel 110, it will be appreciated that such sensors 190 can be located virtually any distance from the control panel 110 as desired. More generally, it is to be understood that all such schematics are not to be taken literally or to scale, each instead conveying a general arrangement or relationship of components.

With continued reference to FIGS. 6 and 7, the water valve 90 is shown schematically as a three-way valve, labeled as a "1" 3-way Electric Ball Valve." Those skilled in the art will appreciate that a variety of such valves now know or later developed that effectively allow for the connection and selection of three lines, or operation in one of three positions, namely, all lines closed, flow through a first pair of lines, or flow through a second pair of lines, may be employed, such that the particular size or configuration of the three-way valve 90, even as schematically represented, is non-limiting. As shown, the valve 90 is connected to the control module 30 as by electrically connecting the valve control terminal 46 (labeled as "Valve Ctl (+)") of the control module 30 to the activation terminal 92 (labeled as "(+) Act") of the valve 90 and connecting the valve power terminal 47 (labeled as "Valve Pwr (+)") of the control module 30 to the positive power terminal 93 (labeled as "+12 VDC") of the valve 90. To complete the power connections for the valve 90, the negative power terminal 94 (labeled as "−12 VDC") is connected to the plug-in wall adapter 95, with the positive side or wire of the adapter 95 also tying into the positive wire interconnecting the valve power terminal 47 (labeled as "Valve Pwr (+)") and the positive power terminal 93 (labeled as "+12 VDC") of the valve 90. Thus, in the exemplary embodiment, the valve 90 gets its power from a plug-in 12 VDC 2A power pack 95, with the negative (−) terminal 94 connected to the valve's black wire and the positive (+) terminal 93 connected to the valve's red wire. The valve's white wire is connected to the valve control terminal 46 ("Valve Ctl (+)") of the control module 30, which outputs +12 VDC when the circuit 30 is triggered. The three-way valve 90 is shown schematically as having a water inlet 96, a water outlet 97, and a pressure release/drain 98. As installed and in operation, as labeled in the figures, the water inlet 96 is connected to a main supply, such as a municipal water source pipe serving a building or the like, and the water outlet 97 is connected to a building inlet pipe that proceeds to supply the plumbing system of the building, in whole or in part. In practice, it will be appreciated that the two pipes—that of the main water supply and that feeding the building—may in many cases be one and the same pipe P (FIG. 1A) within which the valve 90 is installed as by splicing or breaking and removing a section of pipe to be replaced by the valve 90, it joining the two temporarily free ends to complete the flow path to the building. In the exemplary embodiment of FIG. 1A, the valve 90 is shown as being installed in the pipe P downstream of a regulator R and a manual shut-off valve M. Those skilled in the art will of course appreciate that other arrangements are also possible. The third leg of the three-way valve 90, the pressure release/drain 98, as the name implies, connects to a drain pipe or the like that drains to the outside. In "normal" operation, the valve 90 is positioned or rotated such that water flowing into the water inlet 96 from the main supply simply flows through the valve 90 and out the water outlet 97 to the building or plumbing system. Whereas, when the valve 90 is "activated," it is positioned or rotated such that the water inlet 96 is closed and flow is possible between the water outlet 97 feeding the plumbing system and the pressure release/drain 98, whereby any water remaining in the supply pipe P downstream of the valve 90 is no longer under pressure and is able to drain or flow "backwards" through the valve 90 and out of the plumbing system through the pressure release/drain 98, thereby preventing or reducing any further leakage and/or damage caused by water in the pipe P downstream of the valve 90 after it is activated and closed, which water would still be under pressure and so could continue to leak out until relieved. Those skilled in the art will appreciate that according to aspects of the present invention the three-way valve 90 is cleverly installed and operated effectively in the reverse of its typical installation and operation. The conventional installation and operation of such a three-way valve 90 is to connect an inlet or supply pipe to what is labeled and used in the present configuration as the water outlet 97 and then tee off to two different pipes or plumbing systems to selectively supply one or the other based on the position of the valve 90 via what is here labeled and used as the water inlet 96 and the pressure release/drain 98; that is, what is labeled on the "off-the-shelf" valve itself as "output port A" or the like is here used as the water inlet 96, what is labeled on the valve itself as "input port" or the like is here used as the water outlet 97, and what is labeled on the valve itself as "output port B" or the like is here used as the pressure release/drain 98. It will again be appreciated that other such arrangements depending on the system 20 and the particular valve 90 selected are possible without departing from the spirit and scope of the invention, such that the exemplary embodiments are to be understood as illustrative and non-limiting. Once more, the valve 90 shifts from its "normal" position, with flow therethrough to the building or plumbing system, to its "activated" position, with flow blocked and the pressure in the pipe P supplying the building or plumbing system relieved, based on a leak detected via one of the water sensors 190 connected to the security system control panel 110 causing a detection signal to be sent from the first program output terminal 124 (labeled as "Output 1 (−)") on the security system control panel 110 to the trig input terminal 44 (labeled as "(−) Trig") of the control module 30, whereby the control module 30 circuit is triggered or latched and the valve 90 activated under the control of the processor 50 (FIG. 3) in cooperation with the valve control and power terminals 46, 47 (labeled as "Valve Ctl (+)" and "Valve Pwr (+)," respectively) connected to the valve 90 as above-described. Once again, other configurations and connections of the components or combinations thereof are possible according to aspects of the present invention without departing from its spirit and scope.

Turning to FIG. 7, there is shown schematically a further exemplary automatic water shut-off and notification system 20 much like that of FIG. 6, only here wireless water sensors 192 are employed in conjunction with the security system control panel 110, on which basis a radio receiver module 170 is also employed. In a bit more detail, the security system control panel 110 is further configured with a set of common bus terminals 136—here labeled collectively as "Combus" and individually as "R" (red), "B" (black), "Y" (yellow) and "G" (green)—to which is connected the radio receiver module 170, which then operates in cooperation with the control panel 110 in a manner known in the art. The wireless sensors 192 are similar to hardwired sensors but incorporate a battery-operated wireless transmitter that sends a radio signal to the radio receiver module 170 at the control panel 110, eliminating the need for wires, such that the zone terminals 142 on the control panel 110 are shown as having nothing connected. The wireless sensors each have a unique electronic serial number ("ESN") that is programmed into the control panel 110 to recognize and identify each sensor 192 by zone in much the same way that wired sensors 190 (FIG. 6) are zone-specific. Accordingly, using either kind of water sensor 190, 192, the security system control panel 110 is able to identify the zone or location of the detected leak and report such through a variety of means as herein described. And so in either case, individual water detection sensors (either hardwired 190 or wireless 192) are placed on the floor or other surface in areas typically supplied by water (i.e., at, around, or near sinks, toilets, showers, laundry rooms, refrigerators, etc.). It will be appreciated that in some contexts due to wiring limitations or other considerations, a combination of wired and wireless sensors 190, 192 may be employed in a single automatic water shut-off and notification system 20 according to aspects of the present invention.

In terms of the relative locations of the control module 30, valve 90 and security system control panel 110, as should already be appreciated by those skilled in the art, such components can be installed in a variety of locations to suit a particular system 20 and related plumbing system, building layout, or the like. By way of further illustration and not limitation, the schematic views of FIGS. 8A and 8B represent two general arrangements. First, as shown in FIG. 8A, the control module 30 may be physically located substantially nearby or proximate to the security system control panel 110, as also shown in FIGS. 2A-2C, with the water valve 90 some finite distance away. Or, as shown in FIG. 8B, the control module 30 may be physically located substantially nearby or proximate to the water valve 90 with the security system control panel 110 some finite distance away, as also shown in FIGS. 1A and 1B. Again, those skilled in the art will appreciate that a number of other such arrangements are possible without departing from the spirit and scope of the present invention. In FIGS. 8A and 8B here and in FIGS. 9-11 discussed below the water sensors 190, 192 and other features of the various modules and components are not shown for simplicity.

Figure 9:
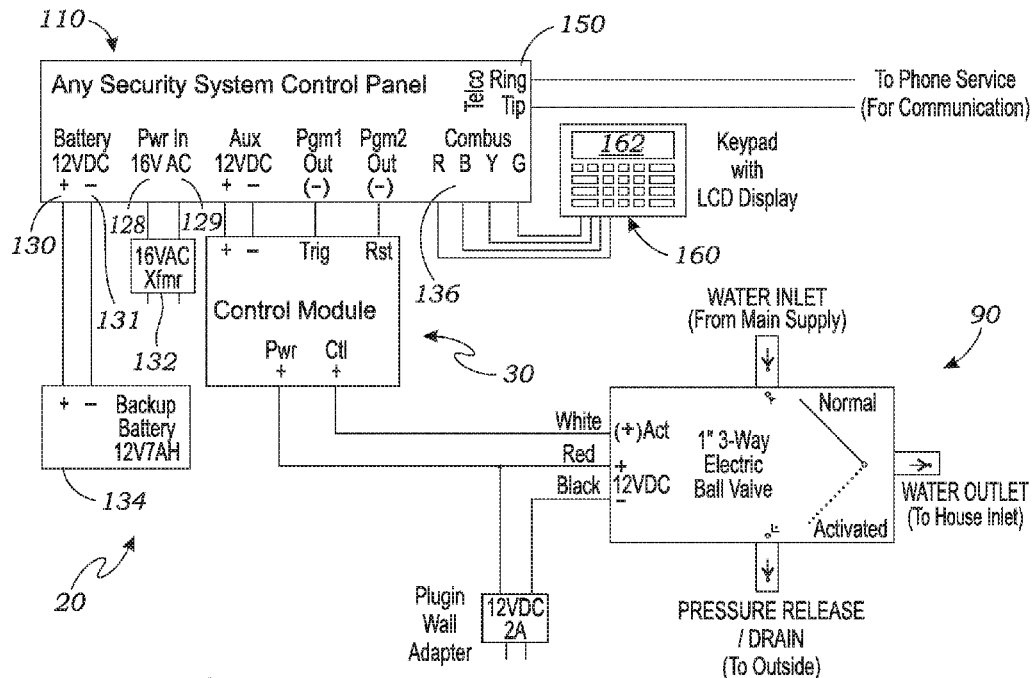
FIG. 9 is an electrical schematic thereof as connected to a security system control panel and a valve, the security system having a keypad and wired phone service connection, in accordance with at least one embodiment.
Figure 10:
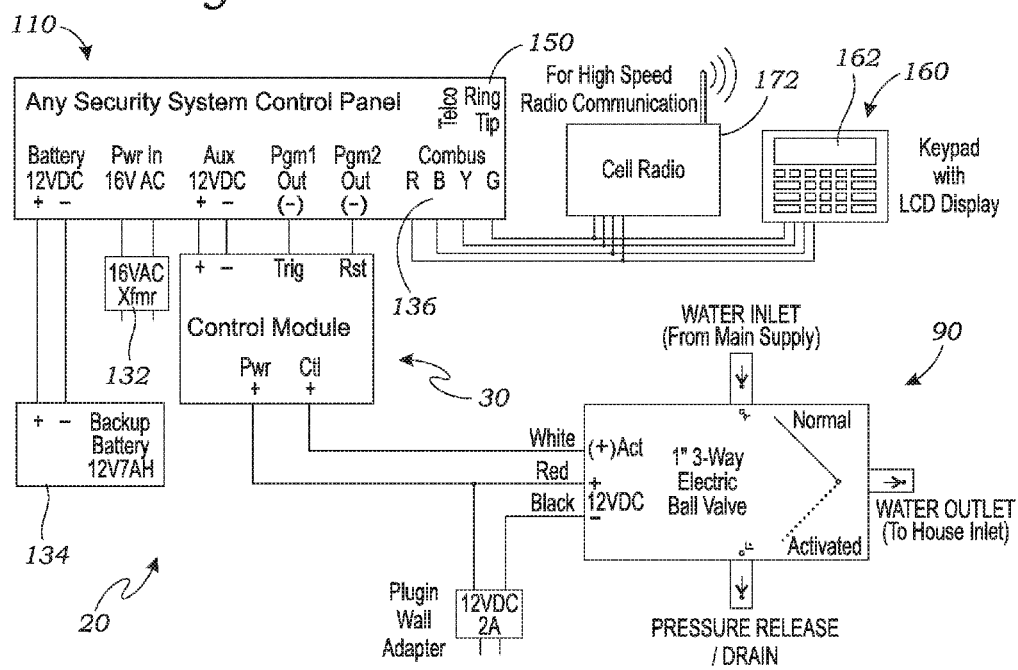
FIG. 10 is an electrical schematic thereof as connected to a security system control panel and a valve, the security system having a keypad and wireless phone service connection, in accordance with at least one embodiment.

Referring next to FIGS. 9 and 10, there are shown schematic views of further exemplary automatic water shut-off and notification systems 20 according to aspects of the present invention. The security system control panel 110 again includes common bus terminals 136 (labeled as "Combus R B Y G"), here with a keypad 160 with LCD display 162 connected. As a further means of communication and interaction with the control panel 110, in the exemplary embodiment of FIG. 9, there is provided one or more telecommunication terminals 150 (labeled as "Telco Ring Tip") for connection to any phone service now known or later developed, such as by using a built-in dialer (not shown) of the control panel 110 to communicate with a central monitoring station. It will be appreciated that, though not shown in FIGS. 2B and 2C, for example, such terminals 150 and others may be included in any security system control panel 110 now known or later developed. Alternatively, as shown in FIG. 10, a cellular radio module 172 or the like can be installed on the panel 110's combus terminal 136 for high speed cell communication to and from the control panel 110, in which case a separate telco connection to a "landline" phone service is not required, though it will be appreciated that certainly both landline and cellular or any other such telecommunications technologies now known or later developed, and in any combination, may be employed as part of the system 20, and the security system 100 specifically. As illustrated, the cellular radio module 172 is connected in "T-Tapped" configuration to the combus terminals 136 between the control panel 110 and the keypad 160, though it will be appreciated that other arrangements are also possible, such as "home-run" or "daisy chain." In any such embodiment, it will again be appreciated that according to aspects of the present invention the connection of one or more water sensors (not shown here for simplicity)

and their operation in detecting a leak and the resulting reporting of such a leak on a specific water sensor- or zone-basis, as enabled by the control panel 110 in cooperation with such notification capabilities as a keypad 160, telecommunications via telco terminals 150, cellular communication via a cellular radio module 172, and/or audible or other alerts such as via the bell terminals 126, 127 (FIG. 2C) in conjunction with the control panel 110's output of a momentary detection signal to the control module 30 that then latches and activates the water valve 90, yields an effective and simplified automatic water shut-off and notification system 20 that is an improvement over prior art systems. With continued reference to FIGS. 9 and 10, there is also shown on the security system control panel 110 first and second AC power terminals 128, 129 to which are connected an external power source, such as a plug-in transformer 132 here indicated as a 16 VAC transformer. Additionally, there is shown first and second battery terminals 130, 131 to which is connected a back-up battery 134 here indicated as a 12 V, 7 A battery. Once more, those skilled in the art will appreciate that a variety of power components and connections now known or later developed may be employed without departing from the spirit and scope of the invention.

Figure 11:
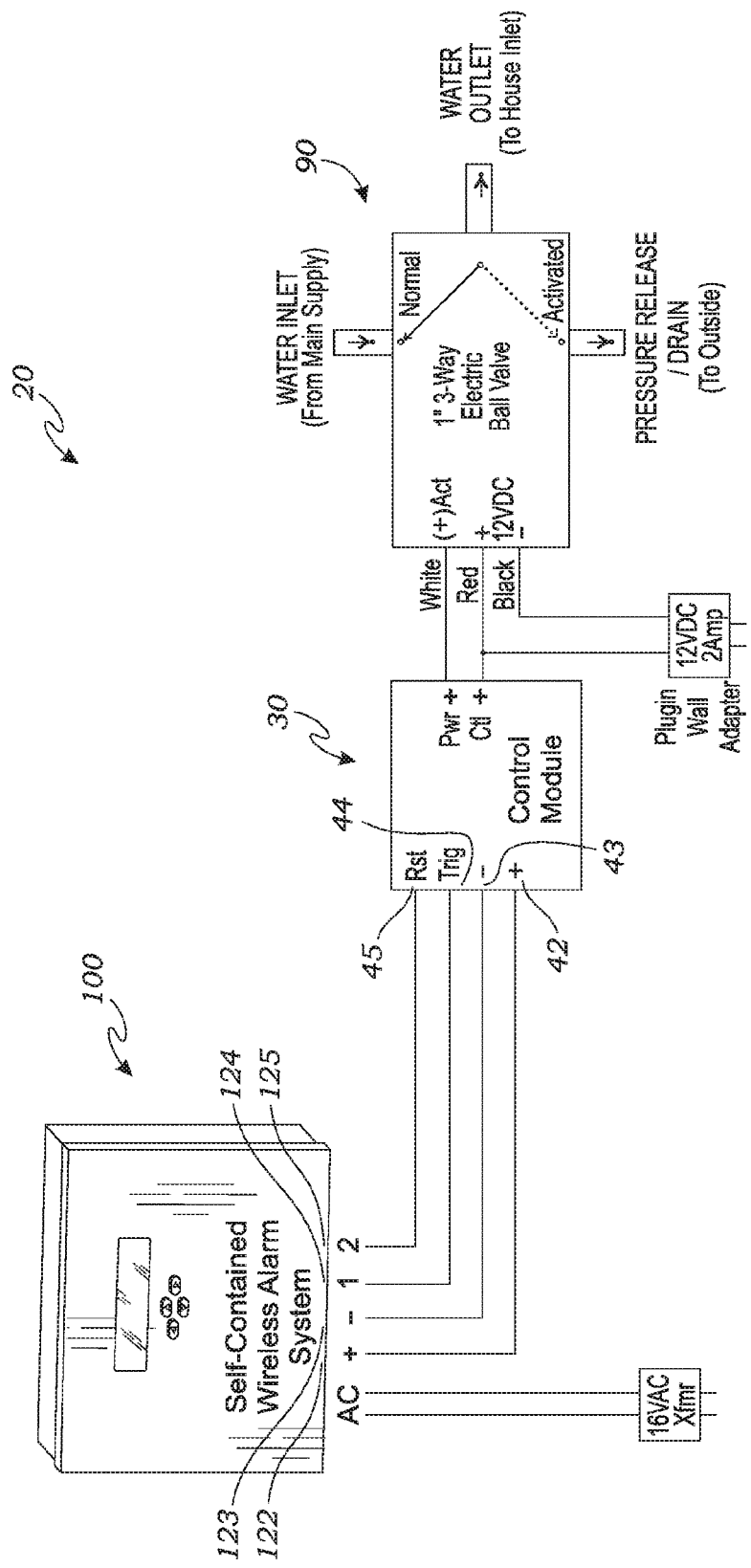
FIG. 11 is an electrical schematic thereof as connected to a wireless security system control panel and a valve, the security system being a self-contained unit, in accordance with at least one embodiment.

Finally, turning to FIG. 11, there is shown a schematic view of a still further exemplary automatic water shut-off and notification system 20 according to aspects of the present invention, here operably installed in connection with a self-contained wireless security system 100. As shown, the security system 100 again includes first and second auxiliary power terminals 122, 123 (labeled as "+" and "−") and first and second program output terminals 124, 125 (labeled as "1" and "2"), again connected to the positive and negative power terminals 42, 43 (labeled as "+" and "−") and trig and remote reset input terminals 44, 45 (labeled as "Trig" and "Rst"), respectively, on the control module 30 generally as described herein. Advantageously, the related control panel, backup battery, radio receiver, dialer and cell communicator are already integrated within the self-contained wireless security system 100, here configured effectively as an LCD keypad (or an all-in-one unit comprising both the control panel and the keypad), so all that is basically required to install the system 20 is mounting the keypad security system 100 to a wall, plugging it into an AC outlet, placing the wireless flood sensor(s), and connecting the control module 30 with a 4-wire cable, with some programming of the sensors and related setup then required to render the system 20 fully operational. Those skilled in the art will appreciate that any such self-contained security system 100 now known or later developed may be effectively employed according to aspects of the present invention without departing from its spirit and scope.

In use, the automatic water shut-off and notification system 20 according to aspects of the present invention, such as shown and described in connection with the various embodiments herein, delivers a unique and advantageous approach to solve the problem of unintentional flooding. Unlike other proprietary flood protection systems, the present system 20 is designed to be universally compatible with a wide array of existing security products and systems. As a result, the system 20's unique concept and simple design adds the very important flood-prevention capability to the many thousands of monitored security systems already installed at a relatively low cost, without the need to purchase and install an expensive self-contained flood prevention system. Again, once installed, the system 20 will substantially instantly shut off the water main, release the pressure in the pipes, and drain them to the outside if any of the system's flood sensors detects water. Because of its small size and extremely low current draw, the control module 30 can easily be installed inside almost any alarm control with only a 4-wire connection (+, −, trig, reset). The control module 30 also has onboard manual test and reset buttons and an "activated" LED to show the status of the valve 90 at a glance. Alternatively, the circuit 30 can be installed at the valve site or anywhere in between the control panel and the valve.

In a bit more detail, and by way of illustration and not limitation, to operably configure the automatic water shut-off and notification system, the control module can be installed in conjunction with an existing security system via the following steps: (1) install the circuit inside the existing control panel using double-sided foam tape and connect its "+" and "−" terminals to the control panel's "Aux Pwr" terminals; (2) connect the circuit's "Trig" terminal to the control panel's "PGM 1" terminal and, optionally, the circuit's "Rst" terminal to the control panel's "PGM 2" terminal; (3) for valve control, connect a 2-wire 18 ga cable from the circuit's "Power" terminal to the red wire on the valve and "CTL" terminal to the white wire on the valve; (4) for valve power, connect the "Neg (−)" terminal of a 12 VDC 2 A plug-in transformer to the black wire on the valve and the "Pos (+)" terminal to the red wire on the valve; and (5) install wired or wireless flood sensors at desired location(s), with hardwired flood sensors each connected to any unused zone input terminal on the control panel. To test the system and commence operation, the panel is powered up and the backup battery is plugged in. Then, programming mode is entered, and "zone X" is defined as a 24-hour wireless flood zone set to activate the "PGM 1" programmable output terminal upon violation (water detection by any sensor, each associated with a particular zone). In the case of wireless sensors, the "ESN" wireless serial number on the sensor is entered for the zone as is a descriptive label (e.g., "Laundry Room Flood"). If multiple sensors are installed, the same is programmed for those zones as well, one by one until all sensors/zones are programmed or configured. In the communication portion of programming, the central station phone number and user account number are programmed. Time and date are programmed, and then programming mode is exited. If the cell radio module is used, a 6" whip antenna or the like is screwed on and the SIM ID# is given to the central station, which activates the radio for two-way cellular communication. The system is now operational and ready to be tested. A green "Ready" indication on the keypad indicates that all zones are normal. Pressing the "Test" button on the control module will illuminate the "Active" led and the valve should immediately close and purge the water in the pipes to the outside. Alternatively, shorting the water sensor's metal contacts with a wet paper towel will activate the module, close the valve, display "(Laundry Room) Flood" on the keypad and transmit that alarm to the central monitoring station. If the cell module is installed, the system sends an email alert to the user's cellphone and the app shows the Laundry Room alarm, and the monitoring station will call the individual(s) on the emergency call list. When the test is completed, pressing the "Reset" button on control module restores the valve and system to normal operating condition. In a multiple sensor system, each wired or wireless flood sensor should be tested individually by using a damp paper towel to short between the two contact pins on the bottom of each sensor. The system will activate as described above, and zone-specific information will be displayed on the keypad and transmitted to the central station and/or the cellphone app. Again, the control module incorporates relatively easily and inexpensively into almost any existing security system which has one or more available zones. Flood sensors (hardwired or wireless) can be added to those zones and coexist with other security or fire sensors such as door contacts, motion detectors, smoke or CO detectors, etc. on the same system. Since the installation is already in place and the system is operational, adding the control module essentially requires only a 4-wire connection to the control panel, placement of one or more flood sensors, programming those new zones, and installing the valve if not already installed. As such, the system is a very cost-effective solution.

In actual (non-test) operation, once more, if a leak (water) is detected at one of the sensors, the detection signal is output from the control panel to the control module, and the valve itself is an electrically activated. Where a three-way stainless steel ball valve or the like is employed, which rotates with full diameter passthrough from position "A" to position "B", the valve is uniquely operated in reverse, with the valve's "Input" used as an output connected to the water pipe feeding the building or downstream plumbing system. The valve's "Output A" is used as the input from the water service, and the valve's "Output B" is used to vent the pressure and drain the water from the building's pipes when the valve is activated. In its normal state, with the control module not latched or tripped and the valve not activated, the valve channels water flow from the service ("Output A") into the building ("Input"). Then, when control module is triggered, the valve ball rotates and switches positions, blocking the water service inlet ("Output A") and opening the channel between the building water pipes ("Input") and the vent/drain ("Output B"). Then, once the source of the leak has been repaired, the control module is reset either by pushing its "Reset" button or by using the remote phone app to activate a second programmable output on the security control panel ("PGM 2"), which sends a (–) ground to the circuit's remote reset terminal, causing the valve to rotate back into its normal operating position, opening the channel between the water service ("Output A") and the building's water pipes ("Input").

In a further important aspect of the present invention, not only is the system capable of detecting and reporting a leak and activating the valve to prevent further damage as explained herein, but it is also able to communicate the health, status and self-diagnostic tests of the entire system including the sensors. This ensures that a fault in any part of the system (from the sensors to the communication integrity) is automatically reported and action can be taken without encumbering the flood detection system add-on with such redundant capability. Other proprietary systems don't do this and are therefore more costly and/or vulnerable to failure due to an undetected and unreported fault; that is, in other such systems, a dedicated controller only sends an alarm notification to the security system but is unable to have that notification pinpoint zone/sensor information. In a modern security system, many conditions are automatically reported to a central monitoring station, either by telephone landline, internet, or high-speed cell radio. Status of system power, backup battery condition, sensor fault, wireless signal, sensor battery, phone line and radio transmission integrity, and regular self-test transmissions are all provided, granting peace of mind that all parts of the flood prevention system are working properly. Using this existing technology and connecting the flood sensors on the security system control panel rather than the control module, the control module can be minimized in terms of size, complexity, and cost with its function relegated essentially to valve control while taking advantage of the functionality of the existing security system for sensor operability and notification and communication, again, including system and sensor status information. By way of illustration, communication is accomplished by at least three exemplary, known technologies, which can be used individually or as redundant backup in case of single-point failure. First, many security systems include a built-in phone dialer, a common and virtually cost-free feature requiring only a 2-wire connection to an existing phone line and allowing communication with a monitoring station by dialing a number and then transmitting data using encoded tones (similar to fax). Panels can typically be programmed to dial up to 3 numbers. Second, a dedicated modem module may be installed in the control panel and provide a high-speed "always on" connection with the central monitoring station by plugging into the subscriber's internet router with a standard "Cat 5" cable or the like. And third, A GSM cell radio module may be installed in the control panel and provide a high-speed communication with the central monitoring station, plus interactive command and control functions of the system via cellphone app. Such allows almost instantaneous data transmission, automatic text or email alerts for system alarms or trouble conditions, and/or the ability for the user to test and reset the system remotely via cellphone. The only additional installation necessary for the radio is a 4-wire connection to the control panel's combus and a short antenna. Again, those skilled in the art will appreciate that a variety of such communication technologies now known or later developed may be employed in conjunction with the present invention without departing from its spirit and scope.

EXAMPLES

The following non-limiting examples are provided for illustrative purposes only in order to facilitate a more complete understanding of the disclosed subject matter. These examples are intended to be a mere subset of all possible contexts in which the automatic water shut-off and notification system 20 may be utilized. Thus, these examples should not be construed to limit any of the embodiments described in the present specification, including those pertaining to particular system configurations and/or methods and uses thereof. Ultimately, the system 20 may be utilized in virtually any context where water leak or flood detection is desired.

Using the DSC Power Series alarm as an example, the security system 100 may entail a DSC Power 1832 Control Panel with 12 V, 7 Amp Backup Battery, a DSC RFK 5500 LCD Keypad with integral 433 MHz radio receiver (to accept wireless signals), and at least one DSC WS4985 wireless flood sensor (1 or more; up to 32 in the DSC 1832 controller), each supplied by Digital Security Controls in Ontario, Canada. The DSC 1832 control panel with the backup battery is mounted in its can on any appropriate wall or other location and wired as follows: (1) a 16 V, 20 VA plug-in transformer is connected with a 2-wire cable to terminals "AC" on the panel; (2) if using the built-in dialer of the DSC 1832 panel to communicate with a central monitoring station, a 2-wire cable is connected from the telco service to terminals "Tip" and "Ring" on the panel, or instead or in addition, a DSC 3G2060R cell radio module may be installed on the board for high-speed cell communication; (3) a 4-wire cable is connected from the DSC RFK5500 Keypad to the combus "R, B, Y, G" terminals on the control panel, with the keypad mounted on the front of the control panel or on any wall or other surface as appropriate and the combus terminals also used to connect the optional cell radio module; (4) with a three-way valve such as the Banjo EV100BL supplied by Banjo Corporation in Crawfordsville, Ind. already installed in the pipe feeding the building or plumbing system, a 2-wire 18 ga cable is connected from the "Power" terminal on the control module to the red wire on the valve and the "CTL" terminal on the control module to the white wire on the valve; (5) a 12 VDC, 2 A plug-in transformer is connected to the "Neg −" terminal via the black wire on the valve and the "Pos +" terminal via the red wire on the valve; and (6) the DSC WS4985 wireless flood sensor(s) are installed on the floor near a sink, dishwasher, washing machine, etc. as appropriate. The alarm panel is programmed to accept signals from either hardwired or wireless water detection sensors (between 1 and 128, depending on the model). Upon detection from one of the water sensors, the control panel will provide an audible and/or visual alert (such as siren or strobe), display on its keypad the specific sensor that's in alarm, and transmit that zone-specific information to a central monitoring station either by phone line, Internet, and/or high-speed cellular communication. The system can also alert the user via the free cellphone app. Simultaneously, a timed programmable output on the DSC control board trips the control module circuit, which latches that output, boosts its power, and activates the three-way valve, shutting off the water and releasing the pressure and draining the water in the pipes safely to the outside. The whole process takes less than a second. If the customer has activated the cell radio service, he or she will instantly receive an email alert and the cellphone app will show which sensor tripped.

As will be appreciated from the foregoing, aspects of the automatic water shut-off and notification system 20 may comprise an add-on control module 30 for control of the valve 90 in response to a detection signal output from the security system control panel 110 or may effectively comprise both the control module 30 and the valve 90 or may comprise a complete system that includes the control module 30 and valve 90 as well as an integrated wireless security panel/keypad 100 and wireless water sensors 190, or any combination thereof or equivalent equipment or technology now known or later developed.

Aspects of the present specification may also be described as follows:

1. An automatic water shut-off and notification system for interfacing with a water valve and an existing security system having a security system control panel and at least one water sensor connected wired or wirelessly on a zone of the security system control panel, the automatic water shut-off and notification system comprising a control module, the control module comprising: a trig input terminal configured for connection with an output terminal of the security system control panel; a valve control terminal and a valve power terminal configured for connection with the water valve; and a processor connected to the trig input terminal and the valve control and valve power terminals, the processor configured to act on a detection signal received at the trig input terminal indicating water detection by the at least one water sensor; wherein with the control module installed and operably connected to the security system control panel and to the water valve, upon water detection by one or more of the at least one water sensors, the security system control panel sends the detection signal via the output terminal to the trig input terminal of the control module, and in response the processor then activates the water valve via the valve control terminal and the valve power terminal to close the water valve and shut off the flow of water in a pipe in which the water valve is installed; whereby the configuration of the control module of the automatic water shut-off and notification system enables use of the functionality of an existing security system and one or more water sensors connected thereto and the resulting output detection signal generated by the security system control panel to control the water valve.

2. The automatic water shut-off and notification system of embodiment 1, wherein the control module further comprises: a control module board; and a control module terminal strip mounted on the control module board and comprising the trig input terminal, the valve control terminal, and the valve power terminal, each terminal being electrically connected to the processor via the control module terminal strip.

3. The automatic water shut-off and notification system of embodiment 2, wherein the control module terminal strip further comprises: a positive power terminal configured for connection with a first auxiliary power terminal of the security system control panel; and a negative power terminal configured for connection with a second auxiliary power terminal of the security system control panel; wherein with the control module installed and operably connected to the security system control panel the control module is powered by the security system control panel.

4. The automatic water shut-off and notification system of embodiment 2 or embodiment 3, wherein: the trig input terminal is configured for connection with a first program output terminal of the security system control panel; and the control module terminal strip further comprises a remote reset input terminal configured to be connected to a second program output terminal of the security system control panel, wherein with the control module installed and operably connected to the security system control panel the second program output terminal and the remote reset input terminal cooperate to enable remote reset of the control module via the security system control panel.

5. The automatic water shut-off and notification system of any of embodiments 2-4, wherein the control module board comprises: a board front side circuit trace; and an opposite board back side circuit trace; wherein the board front and back side circuit traces cooperate to electrically interconnect at least the control module terminal strip and the processor.

6. The automatic water shut-off and notification system of any of embodiments 1-5, wherein the control module further comprises one or more of a manual reset button, a test button, and an indicator light operably connected to the processor.

7. The automatic water shut-off and notification system of any of embodiments 1-6, wherein: the valve control terminal is configured to be connected to an activation terminal of the water valve; and the valve power terminal is configured to be connected to a positive power terminal of the water valve.

8. The automatic water shut-off and notification system of embodiment 7, wherein a relay of the control module is connected to the processor and to the valve control terminal and the valve power terminal, wherein with the control module installed and operably connected to the security system control panel and to the water valve, upon water detection by one or more of the at least one water sensors and receipt by the control module of the corresponding detection signal, in responding to activate the water valve, the processor boosts power to the water valve via the relay.

9. The automatic water shut-off and notification system of any of embodiments 1-8, wherein the water valve is a three-way electric ball valve, whereby with the control module installed and operably connected to the security system control panel and to the water valve, activation of the water valve upon water detection by one or more of the at least one water sensors and receipt by the control module of the corresponding detection signal causes the water valve to both shut off the water flow to the pipe and dump water from the pipe.

10. The automatic water shut-off and notification system of any of embodiments 1-9, wherein: multiple wired or wireless water sensors are connected on multiple respective zone terminals of the security system control panel; and upon water detection by a particular water sensor paired with a particular zone terminal, the security system control panel in addition to sending the detection signal via the output terminal to the trig input terminal for valve activation by the control module also performs one or more of the following: provides an audible alert, provides a visual alert, displays on a keypad connected to the security system control panel zone-specific information related to the water detection, and transmits zone-specific information related to the water detection; whereby the notification capabilities of the existing security system enable communication of water sensor, zone-specific information.

11. An automatic water shut-off and notification system for interfacing with an existing security system having a security system control panel and at least one water sensor connected wired or wirelessly on a zone of the security system control panel, the automatic water shut-off and notification system comprising: a control module comprising: a trig input terminal configured for connection with an output terminal of the security system control panel; a valve control terminal and a valve power terminal configured for connection with the water valve; a relay connected to the valve control terminal and the valve power terminal; and a processor connected to the trig input terminal, the valve control and valve power terminals, and the relay, the processor configured to act on a detection signal received at the trig input terminal indicating water detection by the at least one water sensor; and a water valve formed as a three-way electric ball valve configured to be electrically connected to the control module via the valve control and valve power terminals; wherein with the control module installed and operably connected to the security system control panel and to the water valve operably installed within a pipe, upon water detection by one or more of the at least one water sensors, the security system control panel sends the detection signal via the output terminal to the trig input terminal of the control module, and in response the processor then boosts power to and activates the water valve via the relay in cooperation with the valve control terminal and the valve power terminal to close the water valve to both shut off the water flow to the pipe and dump water from the pipe; whereby the configuration of the control module of the automatic water shut-off and notification system enables use of the functionality of an existing security system and one or more water sensors connected thereto and the resulting output detection signal generated by the security system control panel to control the water valve in stopping further flow into the pipe and relieving pressure within the pipe.

12. The automatic water shut-off and notification system of embodiment 11, wherein the water valve comprises: an activation terminal configured to be connected to the valve control terminal of the control module; and a positive power terminal configured to be connected to the valve power terminal of the control module.

13. The automatic water shut-off and notification system of embodiment 11 or embodiment 12, wherein the water valve comprises: a water inlet configured to be connected to a main water supply; a water outlet configured to be connected to the pipe that feeds water to a building; and a pressure release/drain configured to take water from the pipe away from the building when the water valve is activated.

14. An automatic water shut-off and notification system for interfacing with a water valve and an existing security system having a security system control panel and at least one water sensor connected wired or wirelessly on a zone of the security system control panel, the automatic water shut-off and notification system comprising a control module, the control module comprising: a trig input terminal connected with an output terminal of the security system control panel; a valve control terminal and a valve power terminal connected with the water valve operably installed within a pipe that feeds water to a building; and a processor connected to the trig input terminal and the valve control and valve power terminals, the processor configured to act on a detection signal received at the trig input terminal indicating water detection by the at least one water sensor; wherein upon water detection by one or more of the at least one water sensors, the security system control panel sends the detection signal via the output terminal to the trig input terminal of the control module, and in response the processor then activates the water valve via the valve control terminal and the valve power terminal to close the water valve and shut off the flow of water in the pipe in which the water valve is installed; whereby the configuration of the control module of the automatic water shut-off and notification system enables use of the functionality of an existing security system and one or more water sensors connected thereto and the resulting output detection signal generated by the security system control panel to control the water valve.

15. The automatic water shut-off and notification system of embodiment 14, wherein the water valve is formed as a three-way electric ball valve comprising: an activation terminal connected to the valve control terminal of the control module; a positive power terminal connected to the valve power terminal of the control module; a water inlet connected to a main water supply; a water outlet connected to the pipe that feeds water to a building; and a pressure release/drain configured to take water from the pipe away from the building when the water valve is activated; whereby activation of the water valve upon water detection by one or more of the at least one water sensors and receipt by the control module of the corresponding detection signal causes the water valve to both shut off the water flow to the pipe and dump water from the pipe.

16. The automatic water shut-off and notification system of embodiment 14 or embodiment 15, wherein: multiple wired or wireless water sensors are connected on multiple respective zone terminals of the security system control panel; and upon water detection by a particular water sensor paired with a particular zone terminal, the security system control panel in addition to sending the detection signal via the output terminal to the trig input terminal for valve activation by the control module also performs one or more of the following: provides an audible alert, provides a visual alert, displays on a keypad connected to the security system control panel zone-specific information related to the water detection, and transmits zone-specific information related to the water detection; whereby the notification capabilities of the existing security system enable communication of water sensor, zone-specific information.

17. A method of employing an automatic water shut-off and notification system having a control module connected with a water valve and an existing security system having a security system control panel and at least one water sensor connected wired or wirelessly on a zone of the security system control panel, the method comprising: detecting water by one or more of the at least one water sensors; sending a detection signal based on detecting water from an output terminal of the security system control panel to a trig input terminal of the control module; and activating the water valve under the control of the control module to close the water valve and shut off the flow of water in a pipe in which the water valve is installed; whereby the configuration of the control module of the automatic water shut-off and notification system enables use of the functionality of an existing security system and one or more water sensors connected thereto and the resulting output detection signal generated by the security system control panel to control the water valve.

18. The method of embodiment 17, comprising the further step of powering the control module by the security system control panel.

19. The method of embodiment 17 or embodiment 18, comprising the further step of remotely resetting the control module via the security system control panel.

20. The method of any of embodiments 17-19, wherein the step of activating the water valve further comprises boosting power to the water valve via a relay of the control module.

21. The method of any of embodiments 17-20, wherein the step of activating the water valve further comprises both shutting off the water flow to the pipe and dumping water from the pipe.

22. The method of any of embodiments 17-21, upon water detection by a particular water sensor paired with a particular zone terminal of the security system control panel, comprising the further step of the security system control panel providing a notification of the water detection associated with the particular water sensor and zone in addition to sending the detection signal via the output terminal to the trig input terminal for valve activation by the control module.

23. The method of embodiment 22, wherein the step of providing a water detection notification comprises performing one or more of the following: providing an audible alert, providing a visual alert, displaying on a keypad connected to the security system control panel zone-specific information related to the water detection, and transmitting zone-specific information related to the water detection.

24. The method of any of embodiments 17-23, comprising the further step of acquiring status information regarding the at least one water sensor from the security system control panel.

25. The method of embodiment 24, wherein the step of acquiring status information comprises one of logging into a central station, receiving a text message, receiving a phone call, receiving an email, and accessing a smartphone app.

In closing, regarding the exemplary embodiments of the present invention as shown and described herein, it will be appreciated that an automatic water shut-off and notification system and method of use is disclosed and configured for operably and efficiently interfacing with existing security systems. Because the principles of the invention may be practiced in a number of configurations beyond those shown and described, it is to be understood that the invention is not in any way limited by the exemplary embodiments, but is generally directed to a control module designed to and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

It should be understood that the logic code, programs, modules, processes, methods, and/or the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An automatic water shut-off and notification system for interfacing with a water valve and an existing security system having a security system control panel and at least one water sensor connected wired or wirelessly on a zone of the security system control panel, the automatic water shut-off and notification system comprising a control module, the control module comprising:

a trig input terminal configured for connection with an output terminal of the security system control panel;

a valve control terminal and a valve power terminal configured for connection with the water valve;

a processor connected to the trig input terminal and the valve control and valve power terminals, the processor configured to act on a detection signal received at the trig input terminal indicating water detection by the at least one water sensor;

a control module board; and a control module terminal strip mounted on the control module board and comprising the trig input terminal, the valve control terminal, and the valve power terminal, each terminal being electrically connected to the processor via the control module terminal strip, wherein the control module terminal strip further comprises:

a positive power terminal configured for connection with a first auxiliary power terminal of the security system control panel; and a negative power terminal configured for connection with a second auxiliary power terminal of the security system control panel;

wherein with the control module installed and operably connected to the security system control panel and to the water valve the control module is powered by the security system control panel and, upon water detection by one or more of the at least one water sensors, the security system control panel sends the detection signal via the output terminal to the trig input terminal of the control module, and in response the processor then activates the water valve via the valve control terminal and the valve power terminal to close the water valve and shut off the flow of water in a pipe in which the water valve is installed;

whereby the configuration of the control module of the automatic water shut-off and notification system enables use of the functionality of the existing security system and the one or more water sensors connected thereto and the resulting output detection signal generated by the security system control panel to control the water valve.

2. The automatic water shut-off and notification system of claim 1, wherein:
the trig input terminal is configured for connection with a first program output terminal of the security system control panel; and
the control module terminal strip further comprises a remote reset input terminal configured to be connected to a second program output terminal of the security system control panel, wherein with the control module installed and operably connected to the security system control panel the second program output terminal and the remote reset input terminal cooperate to enable remote reset of the control module via the security system control panel.

3. The automatic water shut-off and notification system of claim 1, wherein the control module board comprises:
a board front side circuit trace; and
an opposite board back side circuit trace;
wherein the board front and back side circuit traces cooperate to electrically interconnect at least the control module terminal strip and the processor.

4. The automatic water shut-off and notification system of claim 1, wherein the control module further comprises one or more of a manual reset button, a test button, and an indicator light operably connected to the processor.

5. The automatic water shut-off and notification system of claim 1, wherein:

the valve control terminal is configured to be connected to an activation terminal of the water valve; and
the valve power terminal is configured to be connected to a positive power terminal of the water valve.

6. The automatic water shut-off and notification system of claim 5, wherein a relay of the control module is connected to the processor and to the valve control terminal and the valve power terminal, wherein with the control module installed and operably connected to the security system control panel and to the water valve, upon water detection by one or more of the at least one water sensors and receipt by the control module of the corresponding detection signal, in responding to activate the water valve, the processor boosts power to the water valve via the relay.

7. The automatic water shut-off and notification system of claim 1, wherein the water valve is a three-way electric ball valve, whereby with the control module installed and operably connected to the security system control panel and to the water valve, activation of the water valve upon water detection by one or more of the at least one water sensors and receipt by the control module of the corresponding detection signal causes the water valve to both shut off the water flow to the pipe and dump water from the pipe.

8. The automatic water shut-off and notification system of claim 1, wherein:

multiple wired or wireless water sensors are connected on multiple respective zone terminals of the security system control panel; and upon water detection by a particular water sensor paired with a particular zone terminal, the security system control panel in addition to sending the detection signal via the output terminal to the trig input terminal for valve activation by the control module also performs one or more of the following: provides an audible alert, provides a visual alert, displays on a keypad connected to the security system control panel zone-specific information related to the water detection, and transmits zone-specific information related to the water detection;

whereby the notification capabilities of the existing security system enable communication of water sensor, zone-specific information.

9. An automatic water shut-off and notification system for interfacing with an existing security system having a security system control panel and at least one water sensor connected wired or wirelessly on a zone of the security system control panel, the automatic water shut-off and notification system comprising:

a control module comprising:
a trig input terminal configured for connection with an output terminal of the security system control panel;
a valve control terminal and a valve power terminal configured for connection with the water valve;
a relay connected to the valve control terminal and the valve power terminal; and
a processor connected to the trig input terminal, the valve control and valve power terminals, and the relay, the processor configured to act on a detection signal received at the trig input terminal indicating water detection by the at least one water sensor; and
a water valve formed as a three-way electric ball valve configured to be electrically connected to the control module via the valve control and valve power terminals;
wherein with the control module installed and operably connected to the security system control panel and to the water valve operably installed within a pipe, upon water detection by one or more of the at least one water sensors, the security system control panel sends the detection signal via the output terminal to the trig input terminal of the control module, and in response the processor then boosts power to and activates the water valve via the relay in cooperation with the valve control terminal and the valve power terminal to close the water valve to both shut off the water flow to the pipe and dump water from the pipe;
whereby the configuration of the control module of the automatic water shut-off and notification system enables use of the functionality of the existing security system and the one or more water sensors connected thereto and the resulting output detection signal generated by the security system control panel to control the water valve in stopping further flow into the pipe and relieving pressure within the pipe.

10. The automatic water shut-off and notification system of claim 9, wherein the water valve comprises:

an activation terminal configured to be connected to the valve control terminal of the control module; and
a positive power terminal configured to be connected to the valve power terminal of the control module.

11. The automatic water shut-off and notification system of claim 9, wherein the water valve comprises:

a water inlet configured to be connected to a main water supply;

a water outlet configured to be connected to the pipe that feeds water to a building; and a pressure release/drain configured to take water from the pipe away from the building when the water valve is activated.

12. An automatic water shut-off and notification system for interfacing with a water valve and an existing security system having a security system control panel and at least one water sensor connected wired or wirelessly on a zone of the security system control panel, the automatic water shut-off and notification system comprising a control module, the control module comprising:

a trig input terminal connected with an output terminal of the security system control panel;

a valve control terminal and a valve power terminal connected with the water valve operably installed within a pipe that feeds water to a building; and a processor connected to the trig input terminal and the valve control and valve power terminals, the processor configured to act on a detection signal received at the trig input terminal indicating water detection by the at least one water sensor;

wherein the water valve is formed as a three-way electric ball valve comprising:

an activation terminal connected to the valve control terminal of the control module;

a positive power terminal connected to the valve power terminal of the control module;

a water inlet connected to a main water supply;

a water outlet connected to the pipe that feeds water to the building; and a pressure release/drain configured to take water from the pipe away from the building when the water valve is activated;

wherein upon water detection by one or more of the at least one water sensors, the security system control panel sends the detection signal via the output terminal to the trig input terminal of the control module, and in response the processor then activates the water valve via the valve control terminal and the valve power terminal to close the water valve to both shut off the flow of water to the pipe in which the water valve is installed and dump water from the pipe;

whereby the configuration of the control module of the automatic water shut-off and notification system enables use of the functionality of the existing security system and the one or more water sensors connected thereto and the resulting output detection signal generated by the security system control panel to control the water valve in stopping further flow into the pipe and relieving pressure within the pipe.

13. The automatic water shut-off and notification system of claim 12, wherein:

multiple wired or wireless water sensors are connected on multiple respective zone terminals of the security system control panel; and upon water detection by a particular water sensor paired with a particular zone terminal, the security system control panel in addition to sending the detection signal via the output terminal to the trig input terminal for valve activation by the control module also performs one or more of the following: provides an audible alert, provides a visual alert, displays on a keypad connected to the security system control panel zone-specific information related to the water detection, and transmits zone-specific information related to the water detection;

whereby the notification capabilities of the existing security system enable communication of water sensor, zone-specific information.

14. A method of employing an automatic water shut-off and notification system having a control module connected with a water valve and an existing security system having a security system control panel and at least one water sensor connected wired or wirelessly on a zone of the security system control panel, the method comprising:

detecting water by a particular water sensor paired with a particular zone terminal of the security system control panel;

sending a detection signal based on detecting water from an output terminal of the security system control panel to a trig input terminal of the control module;

activating the water valve under the control of the control module to close the water valve and shut off the flow of water in a pipe in which the water valve is installed; and providing via the security system control panel, upon water detection by the particular water sensor paired with the particular zone terminal of the security system control panel, a notification of the water detection associated with the particular water sensor and zone;

whereby the configuration of the control module of the automatic water shut-off and notification system enables use of the functionality of the existing security system and the one or more water sensors connected thereto and the resulting output detection signal generated by the security system control panel to control the water valve.

15. The method of claim 14, comprising the further step of powering the control module by the security system control panel.

16. The method of claim 14, comprising the further step of remotely resetting the control module via the security system control panel.

17. The method of claim 14, wherein the step of activating the water valve further comprises boosting power to the water valve via a relay of the control module.

18. The method of claim 14, wherein the step of activating the water valve further comprises both shutting off the water flow to the pipe and dumping water from the pipe.

19. The method of claim 14, wherein the step of providing a water detection notification comprises performing one or more of the following: providing an audible alert, providing a visual alert, displaying on a keypad connected to the security system control panel zone-specific information related to the water detection, and transmitting zone-specific information related to the water detection.

20. The method of claim 14, comprising the further step of acquiring status information regarding the at least one water sensor from the security system control panel.

21. The method of claim 20, wherein the step of acquiring status information comprises one of logging into a central station, receiving a text message, receiving a phone call, receiving an email, and accessing a smartphone app.

* * * * *